(12) United States Patent
Siomina et al.

(10) Patent No.: US 11,792,668 B2
(45) Date of Patent: Oct. 17, 2023

(54) METHOD FOR PERFORMING RADIO LINK MONITORING

(71) Applicant: TELEFONAKTIEBOLAGET LM ERICSSON (PUBL), Stockholm (SE)

(72) Inventors: Iana Siomina, Taby (SE); Muhammad Kazmi, Sundbyberg (SE); Christopher Callender, Kinross (GB); Helka-Liina Maattanen, Helsinki (FI); Icaro L. J. Da Silva, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/863,144

(22) Filed: Jul. 12, 2022

(65) Prior Publication Data
US 2023/0015270 A1  Jan. 19, 2023

Related U.S. Application Data

(63) Continuation of application No. 16/764,477, filed as application No. PCT/IB2018/059021 on Nov. 16, 2018, now Pat. No. 11,388,616.
(Continued)

(51) Int. Cl.
*H04W 24/08* (2009.01)
*H04B 7/06* (2006.01)
(Continued)

(52) U.S. Cl.
CPC .......... *H04W 24/08* (2013.01); *H04B 7/0617* (2013.01); *H04L 5/0048* (2013.01);
(Continued)

(58) Field of Classification Search
CPC .. H04W 24/08; H04W 56/003; H04B 7/1617; H04B 7/0413; H04L 5/0048; H04L 5/0007
See application file for complete search history.

(56) References Cited

U.S. PATENT DOCUMENTS

| 9,143,839 B2 | 9/2015 | Reisman |
| 2015/0146562 A1 | 5/2015 | Sivanesan |

(Continued)

FOREIGN PATENT DOCUMENTS

| RU | 2516237 C2 | 5/2014 |
| WO | 2016168985 A1 | 10/2016 |

OTHER PUBLICATIONS

Qualcomm Incorporated, Radio link monitoring consideration, 3GPP TSG-RAN WG1 Meeting RAN1 #90bis, R1-1718534, Prague, Austria Oct. 9-13, 2017.
(Continued)

*Primary Examiner* — Duc C Ho

(57) ABSTRACT

A method for performing radio link monitoring comprises performing, by a user equipment (UE), a radio link monitoring (RLM) procedure with first RLM parameters; receiving, at the UE, a message including at least one second RLM parameter; identifying, by the UE, a difference between the first RLM parameters and the at least one second RLM parameter; and resetting, at the UE, at least one of the first RLM parameters in response to identifying the difference between the first RLM parameters and the at least one second RLM parameter. The method may configure the UE upon performing RLM by adapting the difference between the current RLM parameters and the future parameters, so that the UE behavior may become clear.

23 Claims, 19 Drawing Sheets

Related U.S. Application Data

(60) Provisional application No. 62/587,218, filed on Nov. 16, 2017.

(51) Int. Cl.
*H04L 5/00* (2006.01)
*H04W 56/00* (2009.01)
*H04B 7/0413* (2017.01)

(52) U.S. Cl.
CPC ......... *H04W 56/003* (2013.01); *H04B 7/0413* (2013.01); *H04L 5/0007* (2013.01)

(56) References Cited

U.S. PATENT DOCUMENTS

| | | |
|---|---|---|
| 2019/0052380 A1 | 2/2019 | Cui et al. |
| 2019/0081691 A1 | 3/2019 | Nagaraja |
| 2019/0081753 A1* | 3/2019 | Jung .................... H04B 7/088 |
| 2019/0200249 A1 | 6/2019 | Yoon |
| 2020/0274657 A1 | 8/2020 | Deenoo |

OTHER PUBLICATIONS

Spreadtrum Communications, "Discussions on the IS and OOS counting procedure (online)", 3GPP TSG RAN WG1 #90bis, 3GPP, Oct. 13, 2017, R1-1717742, Date retrieved Jun. 7, 2021, Internet URL: http://www.3gpp.org/ftp/tsg_ran/WG1_RL1/TSGR1_90b/Docs/R1-1717742.zip.

* cited by examiner

Time:  t1  t2  ...  tn

Time:  t1  t2  ...  tn

METHOD FOR PERFORMING RADIO LINK MONITORING

This application is a continuation of U.S. application Ser. No. 16/764,477, now U.S. Pat. No. 11,388,616 filed on May 15, 2020 which is a 371 of International Application No. PCT/IB2018/059021, filed Nov. 16, 2018, which claims the benefit of U.S. Application No. 62/587,218, filed Nov. 16, 2017, the disclosures of which are fully incorporated herein by reference.

TECHNICAL FIELD

Particular embodiments relate to the field of reconfiguring a user equipment (UE); and more specifically, to methods, apparatus and systems for reconfiguring the UE upon the UE performing a radio link monitoring (RLM).

BACKGROUND

In new radio (NR) which is also referred as 5G or Next Generation, NR architecture is being discussed in 3GPP and the current concept is illustrated in FIG. 1, where eNB denotes LTE eNodeB, gNB and ng-eNB or evolved eNB, denote NR base stations (BSs) where one NR BS may correspond to one or more transmission/reception points, and the lines between the nodes illustrate the corresponding interfaces which are under discussion in 3GPP. Further, FIG. 2 illustrates deployment scenarios with NR BS which are discussed in 3GPP.

Multi-antenna schemes for NR are currently being discussed in 3GPP. For NR, frequency ranges up to 100 GHz are considered. High-frequency radio communication above 6 GHz suffers from significant path loss and penetration loss. Therefore, massive MIMO schemes for NR are considered.

With massive MIMO, three approaches to beamforming have been discussed: analog, digital, hybrid, and a combination of the two. An example diagram for hybrid beamforming is shown in FIG. 3. Beamforming may be on transmission beams and/or reception beams, network side or UE side.

FIGS. 4a and 4b illustrate example beam sweeping with two subarrays and three subarrays respectively. Regarding beam sweeping, the analog beam of a subarray may be steered toward a single direction on each OFDM symbol, and hence the number of subarrays determines the number of beam directions and the corresponding coverage on each OFDM symbol. However, the number of beams to cover the whole serving area is typically larger than the number of subarrays, especially when the individual beam-width is narrow. Therefore, to cover the whole serving area, multiple transmissions with narrow beams differently steered in time domain are also likely to be needed. The provision of multiple narrow coverage beams for this purpose has been called "beam sweeping". For analog and hybrid beamforming, the beam sweeping seems to be essential to provide the basic coverage in NR. For this purpose, multiple OFDM symbols, in which differently steered beams can be transmitted through subarrays, may be assigned and periodically transmitted.

FIG. 5 illustrates an example configuration of SS blocks, SS bursts and SS burst sets/series. FIG. 5 describes a non-limiting example if synchronization signal (SS) block and SS burst configuration which may be assumed in other embodiments. The signals comprised in SS block may be used for measurements on NR carrier, including intra-frequency, inter-frequency, and inter-RAT which is NR measurements from another RAT. SS block may also be referred to as SS/physical broadcast channel (PBCH) block or SS block (SSB).

NR-primary synchronization signal (PSS), NR-secondary synchronization signal (SSS) and/or NR-PBCH may be transmitted within an SS block. For a given frequency band, an SS block corresponds to a number of N OFDM symbols based on one subcarrier spacing which is a default or configured, and N is a constant. UE may be able to identify at least OFDM symbol index, slot index in a radio frame and radio frame number from an SS block. A single set of possible SS block time locations with respect to radio frame or with respect to SS burst set is specified per frequency band. At least for multi-beams case, at least the time index of SS-block is indicated to the UE. The position(s) of actual transmitted SS-blocks may be informed for helping CONNECTED/IDLE mode measurement, for helping CONNECTED mode UE to receive DL data/control in unused SS-blocks and potentially for helping IDLE mode UE to receive DL data/control in unused SS-blocks. For different frequency ranges, the maximum number, L, of SS-blocks within SS burst set is 4 for frequency range up to 3 GHz, 8 for frequency range from 3 GHz to 6 GHz, or 64 for frequency range from 6 GHz to 52.6 GHz.

Regarding SS burst set, one or multiple SS burst(s) further compose an SS burst set or series where the number of SS bursts within a SS burst set is finite. From physical layer specification perspective, at least one periodicity of SS burst set is supported. From UE perspective, SS burst set transmission is periodic. At least for initial cell selection, UE may assume a default periodicity of SS burst set transmission for a given carrier frequency, for example, one of 5 ms, 10 ms, 20 ms, 40 ms, 80 ms, or 160 ms. UE may assume that a given SS block is repeated with a SS burst set periodicity. By default, the UE may neither assume the gNB transmits the same number of physical beam(s), nor the same physical beam(s) across different SS-blocks within an SS burst set. In a special case, an SS burst set may comprise one SS burst.

For each carrier, the SS blocks may be time-aligned or overlap fully or at least in part, or the beginning of the SS blocks may be time-aligned when the actual number of transmitted SS blocks is different in different cells.

FIG. 6 illustrates an example mapping for SS blocks within a time slot and within a 5 ms window. All SS blocks within a burst set are within the 5 ms window, but the number of SS blocks within such window depends on the numerology, for example, up to 64 SS blocks with 240 kHz subcarrier spacing.

The purpose of radio link monitoring (RLM) is to monitor the radio link quality of the serving cell of the UE and use that information to decide whether the UE is in in-sync or out-of-sync with respect to that serving cell. In LTE, RLM is carried out by UE performing measurement on downlink reference symbols (CRS) in RRC_CONNECTED state. If results of radio link monitoring indicate number of consecutive out of sync (OOS) indications, then the UE starts RLF procedure and declares radio link failure (RLF) after the expiry of RLF time (e.g. T310). The actual procedure is carried out by comparing the estimated downlink reference symbol measurements to some target BLER, $Q_{out}$ and $Q_{in}$, $Q_{out}$ and $Q_{in}$ correspond to block error rate (BLER) of hypothetical physical downlink control channel (PDCCH)/physical control format indicator channel (PCIFCH) transmissions from the serving cell. Examples of $Q_{out}$ and $Q_{in}$ are 10% and 2% respectively.

FIG. 7 illustrates an example radio link failure in LTE. The current RLF procedure in LTE has two phases, as depicted in FIG. 7. The first phase starts upon radio problem detection and leads to radio link failure detection. The second phase which is a RRC recovery phase starts upon radio link failure detection or handover failure and leads to RRC_IDLE in case the RRC recovery fails.

For single carrier and carrier aggregation (CA), re-establishment is triggered when PCell experiences RLF. The UE does not monitor the RLF of SCells, which are monitored by the eNB.

For Dual Connectivity (DC), the first phase of the radio link failure procedure is supported for PCell and PSCell. Re-establishment is triggered when PCell experiences RLF. However, upon detecting RLF on the PSCell, the re-establishment procedure is not triggered at the end of the first phase. Instead, the UE informs the radio link failure of PSCell to the MeNB.

RLF may be triggered by layer 1 (L1, a.k.a. physical layer or PHY) or layer 2 (L2), which is then reported to layer 3 (L3). RLM is responsible for L1-triggering, upon receiving N310 consecutive "out-of-sync" indications from lower layers and no recovery which is no "in-sync". L2-triggering may be, e.g., upon indication from RLC that the maximum number of retransmissions has been reached or upon random access problem indication from MAC.

TABLE 1

RLF-related timers in LTE

| Timer | Start | Stop | At expiry |
|---|---|---|---|
| T310 NOTE1 NOTE2 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
| T311 NOTE1 | Upon initiating the RRC connection re-establishment procedure | Selection of a suitable E-UTRA cell or a cell using another RAT. | Enter RRC_IDLE |
| T312 NOTE2 | Upon triggering a measurement report for a measurement identity for which T312 has been configured, while T310 is running | Upon receiving N311 consecutive in-sync indications from lower layers, upon triggering the handover procedure, upon initiating the connection re-establishment procedure, and upon the expiry of T310 | If security is not activated: go to RRC_IDLE else: initiate the connection re-establishment procedure |
| T313 NOTE2 | Upon detecting physical layer problems for the PSCell i.e. upon receiving N313 consecutive out-of-sync indications from lower layers | Upon receiving N314 consecutive in-sync indications from lower layers for the PSCell, upon initiating the connection re-establishment procedure, upon SCG release and upon receiving RRCConnectionReconfiguration including MobilityControlInfoSCG | Inform E-UTRAN about the SCG radio link failure by initiating the SCG failure information procedure as specified in 5.6.13. |

Regarding RLF handling in NR, while the RLM functionality had significant changes in NR, in other words, a more configurable procedure has been defined where the network may define the RS type, exact resources to be monitored and even the BLER for IS and OOS indications, RLF did not have major changes in NR compared to LTE. In RAN2, the following has been agreed in RAN2 #99-bis, in Prague:

| Agreements |
|---|
| 1  RLF detection will be specified for NR in the RRC spec (as in LTE)<br>2  For Dec 17, RLF will be based on the periodic IS/OOS indications from L1 (i.e. this is same frame work as LTE) |

RLF was discussed for NR in RAN2 #97-bis in Spokane, and the following has been agreed:

| Agreements |
|---|
| 1: For connected mode, UE declares RLF upon timer expiry due to DL OOS detection, random access procedure failure detection, and RLC failure detection.<br>FFS whether maximum ARQ retransmission is only criteria for RLC failure (needs to be discussed in common UP/CP session).<br>2  In NR RLM procedure, physical layer performs out of sync/in sync indication and RRC declares RLF.<br>3  For RLF purposes, RAN2 preference is that the in sync/out of sync indication should be a per cell indication, and we aim for a single procedure for both multi-beam and single beam operation. |

Then in RAN2 #99, in Berlin, the following has been agreed:

| Agreements |
|---|
| 1  RAN2 understanding of RAN1 agreements that at least PHY informs RRC of periodic out-of-sync/in-sync indications.<br>2  Baseline behaviour when there are no indications from lower layers related to beam failure/recovery:<br>i/RRC detects DL radio link problem if consecutive N1 number of periodic out-of-sync indications are received.<br>ii/RRC stops the timer if consecutive N2 number of periodic in-sync indications are received while the timer runs. |

In other words, as in LTE, it may assume that RLF in NR will also be governed by any one of the following parameter or equivalent selected from counters, N310, N311, N313, N314, and timers, 310, T311, T301, T313, T314.

Hence, it may expect similar behavior as in LTE to certain extent. Below it reproduces how RLF variables may be configured in NR and UE behavior, recently agreed for NR.

Regarding radio link failure related actions, in response to detecting physical layer problems in RRC_CONNECTED, the UE shall:
  1> upon receiving N310 consecutive "out-of-sync" indications for the PCell from lower layers while T311 is not running
    2> start timer T310;
  1> upon receiving N313 consecutive "out-of-sync" indications for the PSCell from lower layers while T307 is not running:
    2> start T313;
FFS: Under which condition physical layer problems detection is performed, e.g. neither T300, T301, T304 nor T311 is running. It's subject to the harmonization of the RRC procedures for RRC Connection establishment/resume/re-establishment and RRC connection reconfiguration.

FFS: The naming of the timers.

Regarding a recovery of physical layer problems, upon receiving N311 consecutive "in-sync" indications for the PCell from lower layers while T310 is running, the UE shall:
  1> stop timer T310;
FFS: whether to support T312 for early RLF declaration in NR.
  NOTE 1: In this case, the UE maintains the RRC connection without explicit signalling, i.e. the UE maintains the entire radio resource configuration.
  NOTE 2: Periods in time where neither "in-sync" nor "out-of-sync" is reported by layer 1 do not affect the evaluation of the number of consecutive "in-sync" or "out-of-sync" indications.

Upon receiving N314 consecutive "in-sync" indications for the PSCell from lower layers while T313 is running, the UE shall:
  1> stop timer T313.

Upon detecting a radio link failure, the UE shall:
  1> upon T310 expiry; or
  1> upon random access problem indication from MCG MAC while T311 is not running; or
FFS: Under which condition physical layer problems detection is performed, e.g. neither T300, T301, T304 nor T311 is running. It's subject to the harmonization of the RRC procedures for RRC Connection establishment/resume/re-establishment and RRC connection reconfiguration.
  1> upon indication from MCG RLC that the maximum number of retransmissions has been reached for an SRB or for an MCG or split DRB:
FFS whether maximum ARQ retransmission is only criteria for RLC failure.
    2> consider radio link failure to be detected for the MCG i.e. RLF;
FFS Whether indications related to beam failure recovery may affect the declaration of RLF.
FFS: How to handle RLC failure in CA duplication for MCG DRB and SRB.
FFS: RLF related measurement reports e.g VarRLF-Report is supported in NR.
    2> if AS security has not been activated:
      3> perform the actions upon leaving RRC_CONNECTED as specified in x.x.x, with release cause 'other':
    2> else:
      3> initiate the connection re-establishment procedure as specified in x.x.x;
  Otherwise, the UE shall:
  1> upon T313 expiry; or
  1> upon random access problem indication from SCG MAC; or
  1> upon indication from SCG RLC that the maximum number of retransmissions has been reached for an SCG SRB, SCG or split DRB:
    2> consider radio link failure to be detected for the SCG i.e. SCG-RLF; FFS: How to handle RLC failure in CA duplication for SCG DRB and SRB.
    2> initiate the SCG failure information procedure as specified in 5.6.4 to report SCG radio link failure.

Table 2 below illustrates timers related to radio link failure.

TABLE 2

RLF-related timers in NR

| Timer | Start | Stop | At expiry |
|---|---|---|---|
| T307 | Reception of RRCConnectionReconfiguration message including MobilityControlInfoSCG | Successful completion of random access on the PSCell, upon initiating re-establishment and upon SCG release | Inform E-UTRAN/NR about the SCG change failure by initiating the SCG failure information procedure as specified in 5.6.4. |
| T310 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
| T311 | Upon initiating the RRC connection re-establishment procedure | Selection of a suitable NR cell or a cell using another RAT. | Enter RRC_IDLE |
| T313 | Upon detecting physical layer problems for the PSCell i.e. upon receiving N313 consecutive out-of-sync indications from lower layers | Upon receiving N314 consecutive in-sync indications from lower layers for the PSCell, upon initiating the connection re-establishment procedure, upon SCG release and upon receiving RRCConnectionReconfiguration including MobilityControlInfoSCG | Inform E-UTRAN/NR about the SCG radio link failure by initiating the SCG failure information procedure as specified in 5.6.4. |

Table 3 below illustrates constants related to radio link failure.

TABLE 3

RLF-related constants

| Constant | Usage |
|---|---|
| N310 | Maximum number of consecutive "out-of-sync" indications for the PCell received from lower layers |
| N311 | Maximum number of consecutive "in-sync" indications for the PCell received from lower layers |
| N313 | Maximum number of consecutive "out-of-sync" indications for the PSCell received from lower layers |
| N314 | Maximum number of consecutive "in-sync" indications for the PSCell received from lower layers |

The IE RLF-TimersAndConstants contains UE specific timers and constants applicable for UEs in RRC_CONNECTED.

TABLE 4

RLF-TimersAndConstants information element

```
-- ASN1START
RLF-TimersAndConstants::=     CHOICE {
    release                   NULL,
    setup                     SEQUENCE {
        t301                  ENUMERATED {
            ms100, ms200, ms300, ms400,
ms600, ms1000, ms1500,
            ms2000, ms2500, ms3000, ms3500,
ms4000, ms5000,
            ms6000, ms8000, ms10000},
        t310                  ENUMERATED {
            ms0, ms50, ms100, ms200, ms500,
ms1000, ms2000, ms4000, ms6000},
        n310                  ENUMERATED {
            n1, n2, n3, n4, n6, n8, n10, n20},
```

TABLE 4-continued

RLF-TimersAndConstants information element

```
        t311                  ENUMERATED {
            ms1000, ms3000, ms5000, ms10000,
ms15000,
            ms20000, ms30000},
        n311                  ENUMERATED {
            n1, n2, n3, n4, n5, n6, n8, n10},
        ...
    }
}
        t313                  ENUMERATED {
            ms0, ms50, ms100, ms200, ms500,
ms1000, ms2000},
        n313                  ENUMERATED {
            n1, n2, n3, n4, n6, n8, n10, n20},
        n314                  ENUMERATED {
            n1, n2, n3, n4, n5, n6, n8, n10},
        ...
    }
}
-- ASN1STOP
```

RLM is typically performed in LTE by the UE estimating a metric, such as signal to noise and interference ratio (SINR) on reference symbols, such as cell specific reference symbols (CRS). The quality metric (e.g. SINR) is not standardized but rather PDCCH block error (BLER) thresholds for out of sync ($Q_{out}$) and in-sync ($Q_{in}$), such as 10% and 2%, are specified. The UE is expected to estimate BLER for a so called hypothetical PDCCH BLER using its quality measurement (e.g. SINR), such that it detects out of sync when the BLER is greater than $Q_{out}$, and detects in sync when the BLER is smaller than $Q_{in}$. The BLER is referred to as hypothetical BLER because it can be estimated by the UE from RS, even when there are no PDCCH transmissions targeted to the UE. Since it would be undesirable to send an out-of-sync or an in-sync indication in response to short term fading of the radio channel, so called evaluation periods are specified for $Q_{in}$ and $Q_{out}$ evaluation. The evaluation periods are fixed in the specifications and are performed by layer 1 in addition to the configurable timers and counters for the higher layers mentioned in the table above.

Regarding RLM in NR, one of the main differences in the NR RLM functionality, compared to LTE, is that the RLM functionality in LTE is described in the specifications, so that the UE actions do not depend on parameters configured by the network. On the other hand, in NR, due to the wide range of frequencies and diversity of envisioned deployments and services, RLM is a quite configurable procedure. In NR, the network may configure the UE to perform RLM based on different RS types (SS/PBCH block and CSI-RS), the exact resources to be monitored and the exact number to generate IS/OOS indications, and the BLER thresholds, so that measured SINR values may be mapped to them to generate IS/OOS events to be indicated to the higher layers.

RLM in NR is performed based on up to 8 preliminary RLM RS resources configured by the network, where one RLM-RS resource may be either one SS/PBCH block or one CSI-RS resource/port, or where the RLM-RS resources are UE-specifically configured at least in case of CSI-RS based RLM.

When a UE is configured to perform RLM on one or multiple RLM-RS resource(s), periodic IS (in-sync) is indicated if the estimated link quality corresponding to hypothetical PDCCH BLER based on at least Y=1 RLM-RS resource among all configured X RLM-RS resource(s) is above $Q_{in}$ threshold, and periodic OOS is indicated if the estimated link quality corresponding to hypothetical PDCCH BLER based on all configured X RLM-RS resource(s) is below $Q_{out}$ threshold.

The same problem applies to the cell quality derivation for support of RRC_CONNECTED state mobility, i.e. handover, as the cell quality derivation mechanism is similar. The consequence is that measurement reports for N>1 would be triggered earlier, if triggered by the cell qualities of cells with fewer beams compared to the case of cells with more beams, which is also counterproductive and may result in suboptimal handover decisions.

As RLM in NR is a configurable procedure, the network may configure the UE with different parameters affecting how the UE generates IS and OOS indications to the higher layers e.g. via an RRCConfiguration message. RLM parameters may be provided when the UE establishes a connection (e.g. moving from RRC_IDLE to RRC_CONNECTED state), when the UE resumes an RRC connection (e.g. moving from RRC_INACTIVE to RRC_CONNECTED state), when the UE performs handover to a target cell, when upon beam failure detection, the UE performs beam recovery, or when the network decides to re-configure previously provided parameters for other reasons such as when the configuration of the control channels the UE needs to monitor is changed.

Upon the configuration or re-configuration of RLM parameters, the UE behavior is unclear and currently unspecified regarding what the UE shall do upon the configuration or re-configuration of the set of RLM RS resources to be monitored, or upon the configuration or re-configuration of the BLER threshold pair for generating IS and OOS indications to the higher layers. In certain scenarios, the set of RLM RS resources being changed means that one or more new RLM RSs are added, one or more are removed, or one or more are changed or replaced by other, when network adds or removes RLM RS resources without changing the RS type, e.g. CSI-RS or SS/PBCH block remains the same, or when network adds or removes RLM RS resources that may be from a different RS type, e.g. UE is monitoring only a set of CSI-RS resources and network adds SS/PBCH block and removes a set of the CSI-RS resources or vice-versa.

SUMMARY

To address the foregoing problems with existing solutions, disclosed are methods, a user equipment (UE), and a communication system for performing radio link monitoring upon configuring a UE by identifying a difference between the current RLM parameter which the UE is performing and the future RLM parameter which the UE is going to adapt. The present disclosure implements a solution for configuring the UE with the future RLM parameter upon the UE performing the current RLM parameter. Therefore, the UE behavior is clear during the configuration or re-configuration.

Several embodiments are elaborated in this disclosure. According to one embodiment, a method for performing radio link monitoring comprises performing, by a UE, a RLM procedure with first RLM parameters. The method additionally comprises receiving, at the UE, a message including at least one second RLM parameter. The method further comprises identifying, by the UE, a difference between the first RLM parameters and the second RLM parameter. The method yet further comprises resetting, at the UE, at least one of the first RLM parameters in response to identifying the difference between the first RLM parameters and the second RLM parameter.

In one embodiment, the first RLM parameters and the second RLM parameter are RLM reference signal (RLM-RS) resources for in sync and out of sync indications, block error rate (BLER) for in-sync and out-of-sync indications, or a combination of RLM-RS resources and BLER for in-sync and out-of-sync indications.

In one embodiment, identifying the difference between the first RLM parameters and the second RLM parameter comprises identifying that the first RLM parameters are a first group of RLM-RS resources, and identifying that the second RLM parameter is a second group of RLM-RS resources added to the first group of RLM-RS resources. In one embodiment, the method further comprises adapting the first group of the RLM-RS resources and the added second group of RLM-RS resources.

In one embodiment, identifying the difference between the first RLM parameters and the second RLM parameter comprises identifying that the first RLM parameters are a first group of RLM-RS resources, and identifying that the second RLM parameter is a second group of RLM-RS resources that replace a subset of the first group of RLM-RS resources. In one embodiment, the method further comprises adapting the partly-replaced first group of the RLM-RS resources and the replacing second group of RLM-RS resources.

In one embodiment, identifying the difference between the first RLM parameters and the second RLM parameter comprises identifying that the first RLM parameters are a first group of RLM-RS resources, and identifying that the second RLM parameter is a second group of RLM-RS resources comprising the first group of RLM-RS resources without a subset of RLM-RS resources. In one embodiment, the method further comprises adapting the first group of RLM-RS resources without the subset of RLM-RS resources.

In one embodiment, identifying the difference between the first RLM parameters and the second RLM parameter comprises identifying that the first RLM parameters are a first group of RLM-RS resources, and identifying that the second RLM parameter is a second group of RLM-RS resources which replace the first group of RLM-RS resources. In one embodiment, the method further comprises adapting the second group of RLM-RS resources.

In one embodiment, identifying the difference between the first RLM parameters and the second RLM parameter comprises identifying that the at least one second RLM parameter increases a BLER threshold to generate the out-of-sync indications. In one embodiment, resetting at least one of the first RLM parameters comprises resetting at least one out-of-sync counter in response to identifying the difference between the first RLM parameters and the second RLM parameter.

In one embodiment, identifying the difference between the first RLM parameters and the at least one second RLM parameter comprises identifying that the at least one second RLM parameter decreases a BLER threshold to generate the out-of-sync indications. In one embodiment, resetting at least one of the first RLM parameters comprises resetting at least one out-of-sync counter in response to identifying the difference between the first RLM parameters and the second RLM parameter.

In one embodiment, identifying the difference between the first RLM parameters and the at least one second RLM parameter comprises identifying that the at least one second RLM parameter increases a BLER threshold to generate the in-sync indications. In one embodiment, resetting at least one of the first RLM parameters comprises resetting at least one in-sync counter in response to identifying the difference between the first RLM parameters and the second RLM parameter.

In one embodiment, identifying the difference between the first RLM parameters and the at least one second RLM parameter comprises identifying that the at least one second RLM parameter decreases a BLER threshold to generate the in-sync indications. In one embodiment, resetting at least one of the first RLM parameters comprises resetting at least one in-sync counter in response to identifying the difference between the first RLM parameters and the second RLM parameter.

In one embodiment, when the first group of RLM-RS resources is not the same type of RLM-RS resources as the second group of RLM-RS resources, the UE does not reset any timers or counters.

In one embodiment, when the first group of RLM-RS resources is the same type of RLM-RS resources as the second group of RLM-RS resources, the UE resets at least one timer or counter.

In one embodiment, the method further comprises stopping at least one radio link failure (RLF) related timer at the UE.

According to another embodiment, a UE for performing radio link monitoring comprises at least one processor, and at least one storage that stores processor-executable instructions, when executed by the processor, causes the UE to perform a radio link monitoring (RLM) procedure with first RLM parameters; receive, from a network node, a message including at least one second RLM parameter; identify a difference between the first RLM parameters and the at least one second RLM parameter; and reset at least one of the first RLM parameters in response to identifying the difference between the first RLM parameters and the at least one second RLM parameter.

According to another embodiment, a communication system for performing radio link monitoring comprises a UE and a network node. The UE comprises at least one processor configured to perform a radio link monitoring (RLM) procedure with first RLM parameters; receive, from a network node, a message including at least one second RLM parameter; identify a difference between the first RLM parameters and the at least one second RLM parameter; and reset at least one of the first RLM parameters in response to identifying the difference between the first RLM parameters and the at least one second RLM parameter.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may identify the difference between the current configuration and the future configuration for a UE, so that the UE may properly be configured while performing radio link monitoring.

The present embodiments further an optimized UE behavior in radio link monitoring when the network configures a UE. The present embodiments facilitate the configuration procedure and improve the network efficiency since UE does not need to reset or stop the current configuration to adapt the future configuration. The UE may reset only part of the RLM parameters in the current configuration to adapt the future configuration.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
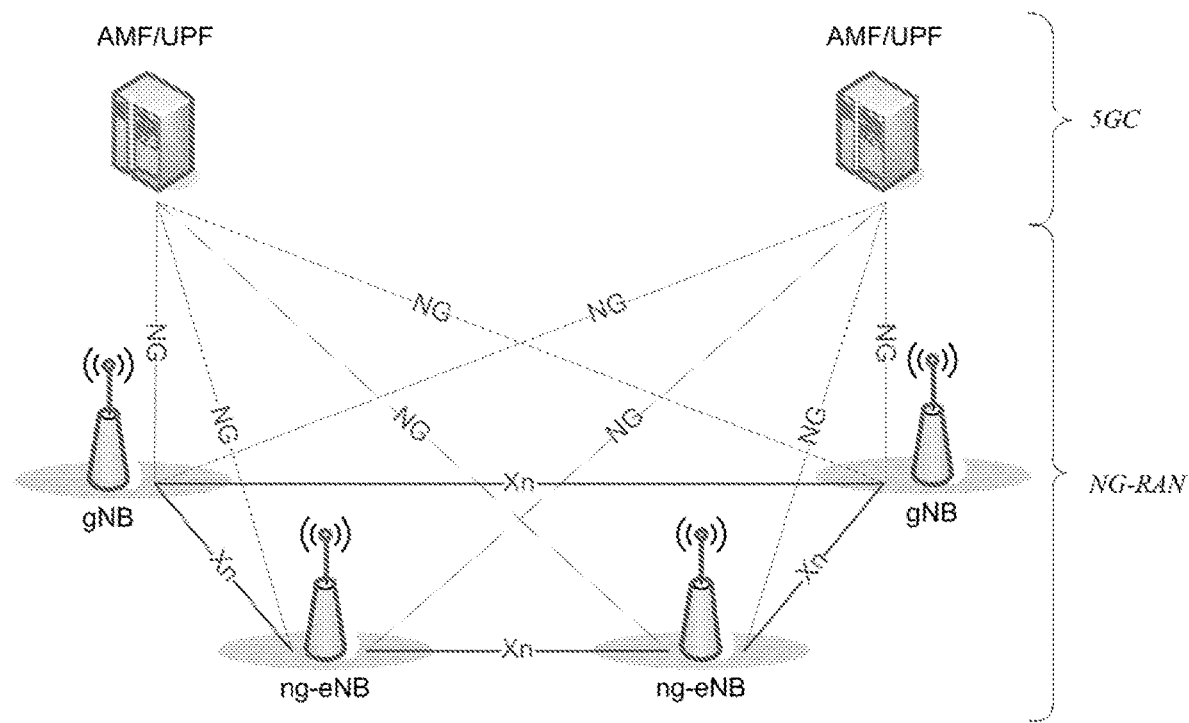
FIG. 1 illustrates an example new radio architecture.
Figure 2:
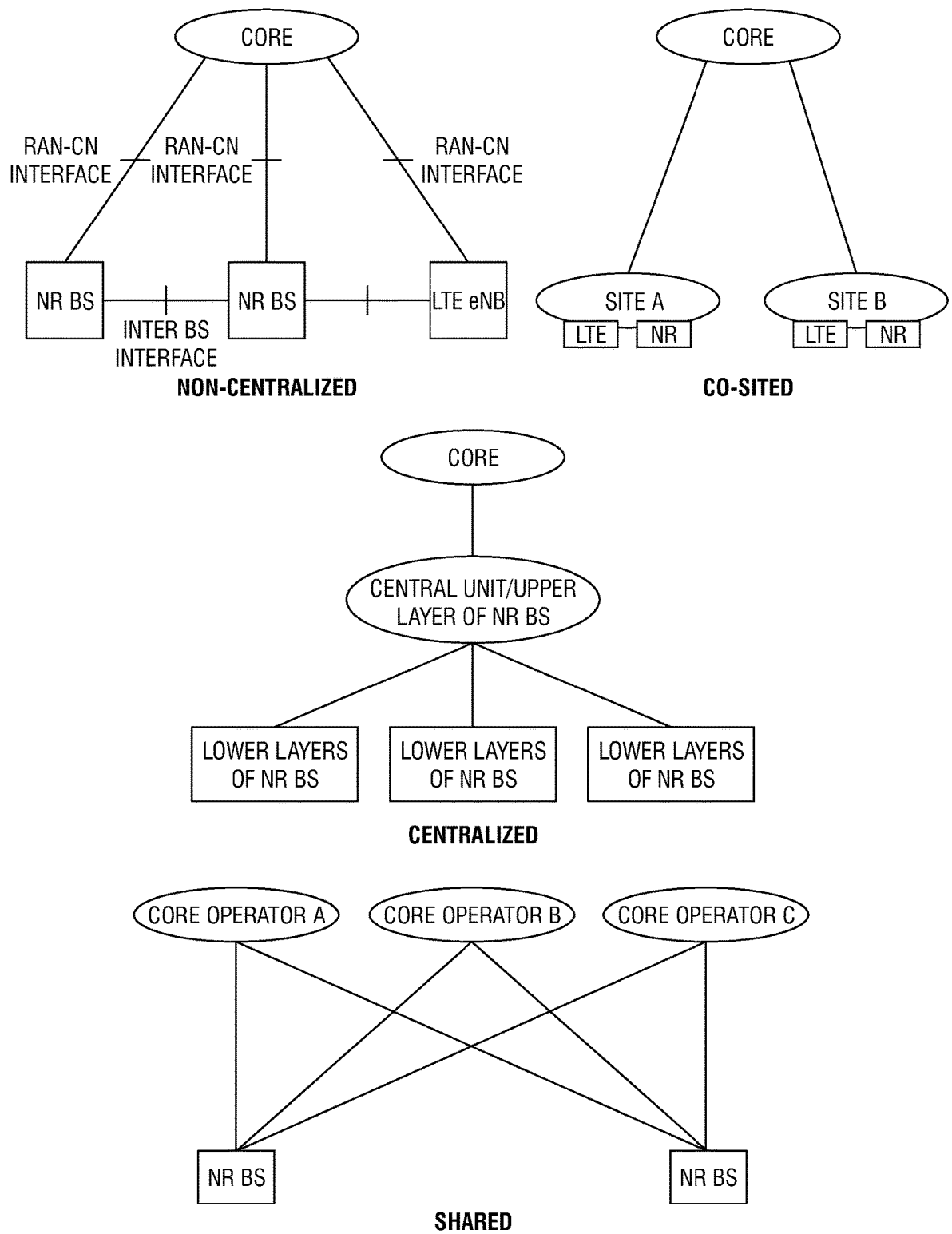
FIG. 2 illustrates multiple example new radio deployments.
Figure 3:
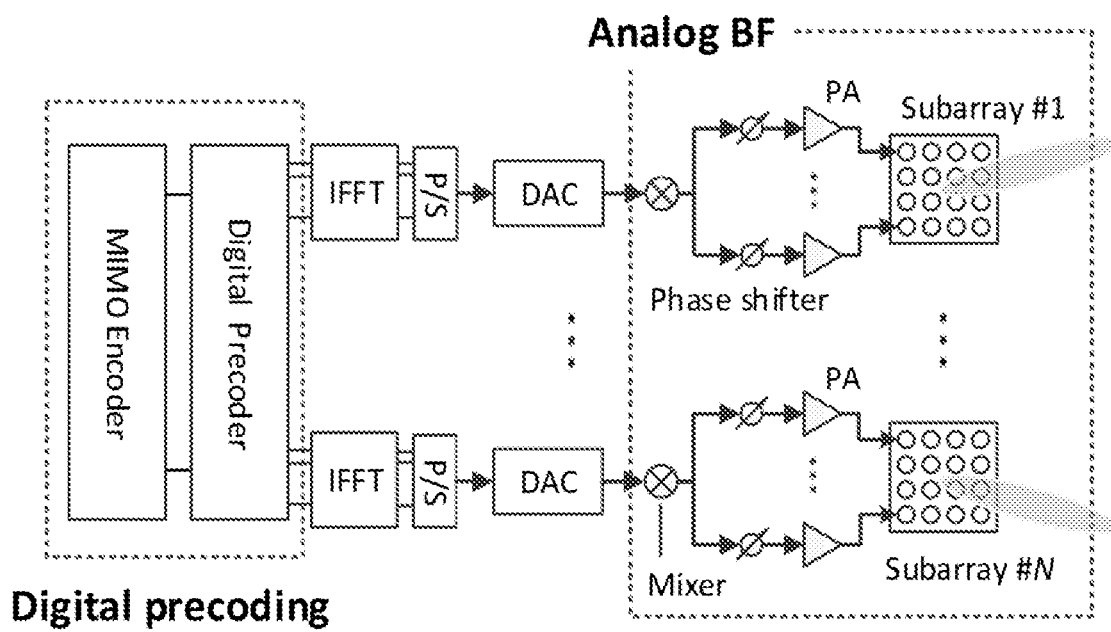
FIG. 3 illustrates an example hybrid beamforming.
Figure 4A:
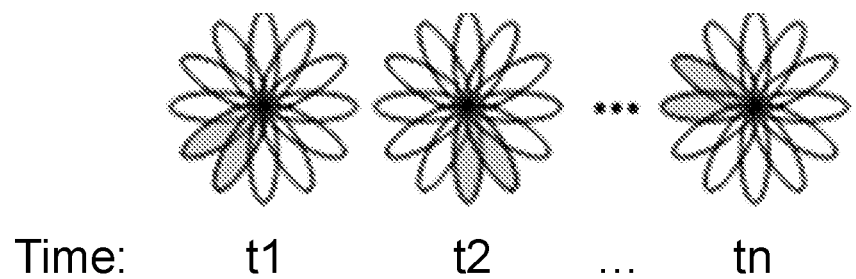
FIGS. 4*a* and 4*b* illustrate example beam sweepings with two subarrays and three subarrays.
Figure 4B:
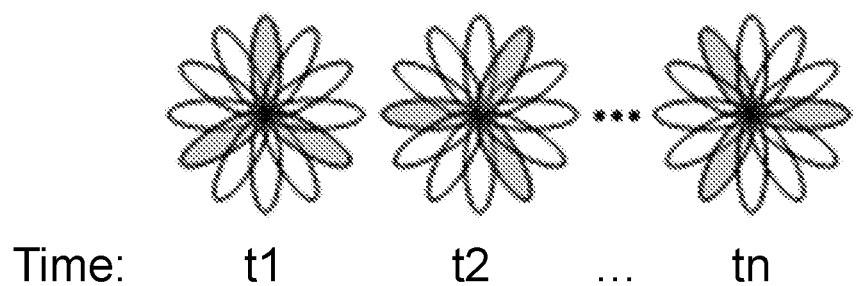
Figure 5:
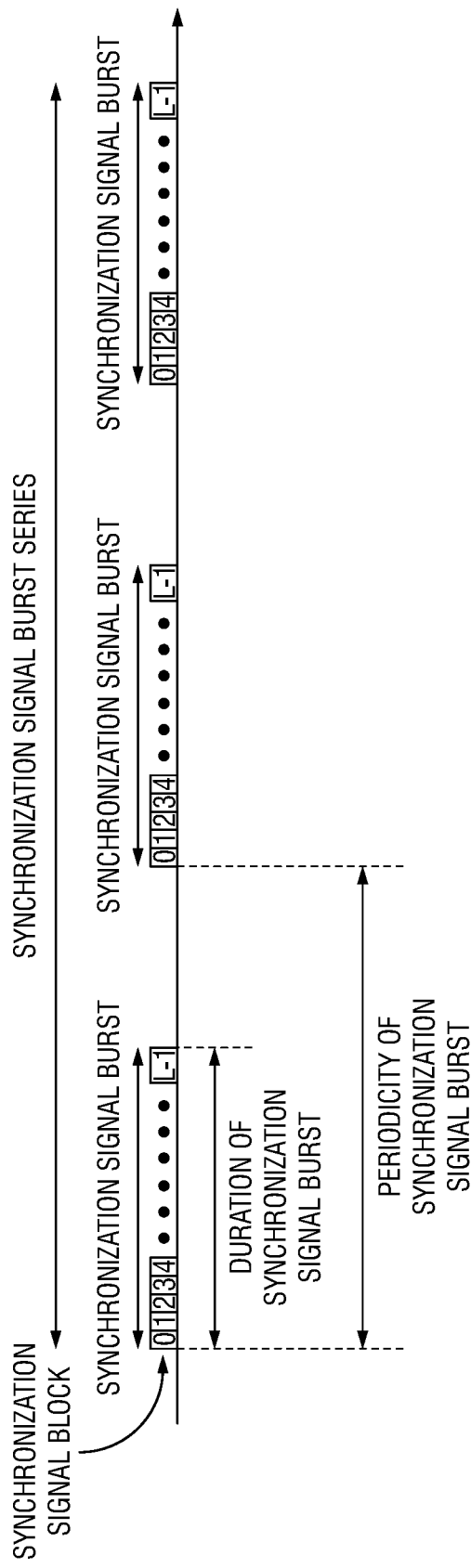
FIG. 5 illustrates an example configuration of SS blocks, SS bursts, and SS burst sets.
Figure 6:
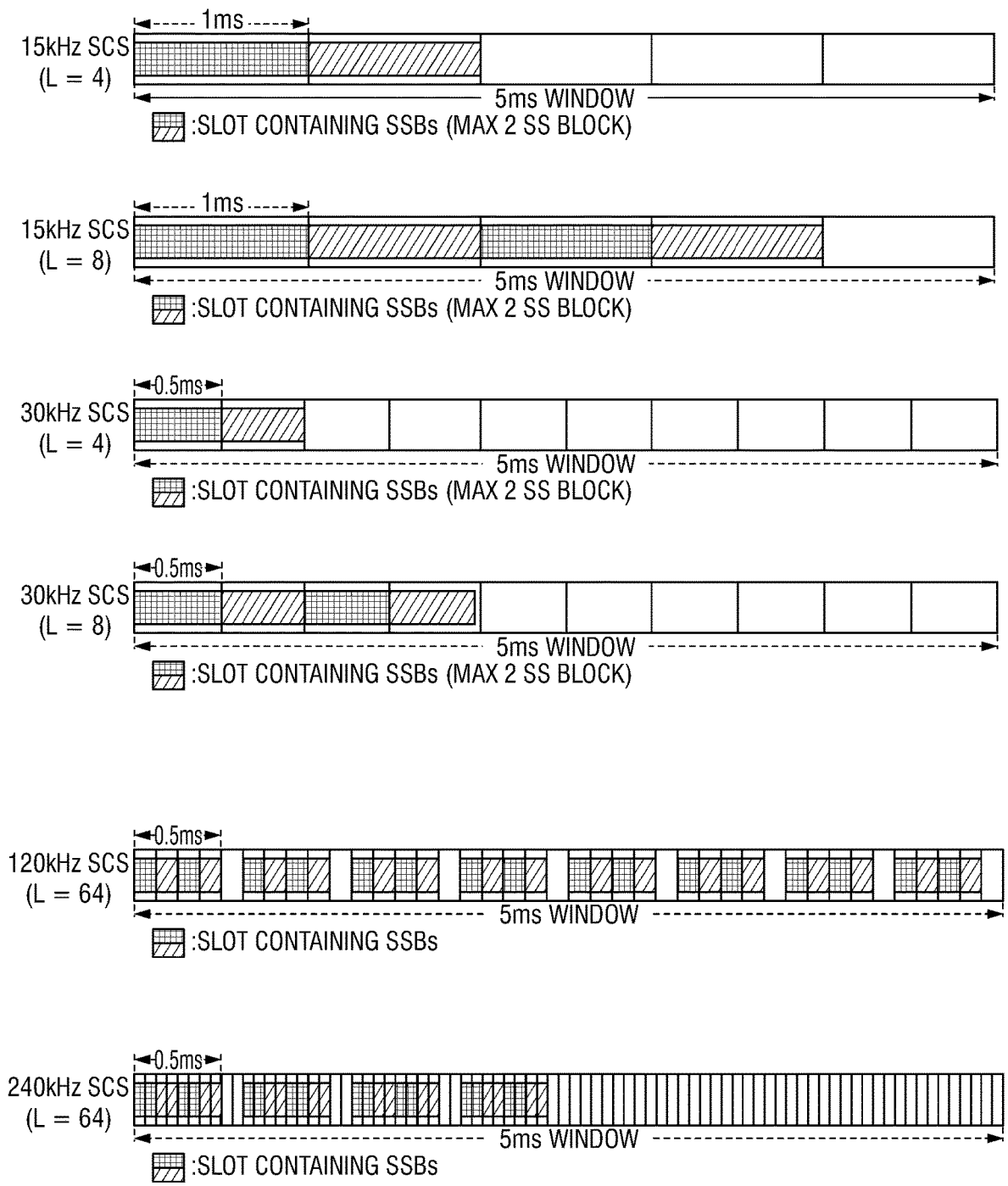
FIG. 6 illustrates example mappings for different numbers of SS blocks.
Figure 7:
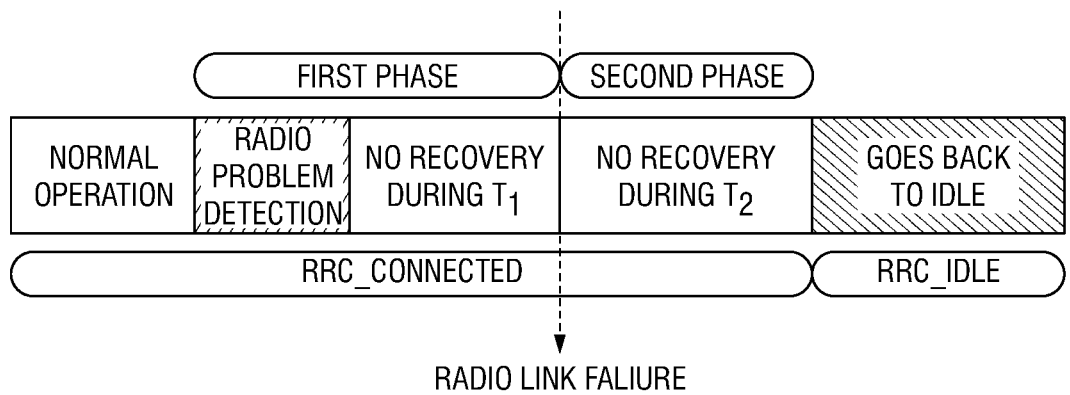
FIG. 7 illustrates an example radio link failure in LTE.

As radio link monitoring is a configurable procedure, the UE behavior becomes unclear, and the actions which the UE should be performing upon the configuration are not specified. Not knowing the UE behavior upon configuration may cause certain problems, such as how the UE will generate indications to higher layers. Therefore, particular embodiments of the present disclosure propose a method to identify a difference between the current RLM parameters and the future RLM parameters, so that the UE may be configured with the future RLM parameters by adapting the difference while using the current RLM parameters.

With the identification of the difference between the current RLM parameters and the future RLM parameters, the UE behavior may become definite upon the configuration. Before adapting the future RLM parameters, the UE may keep performing the current RLM parameters. Furthermore, the UE may only reset or partially stop current RLM parameters to adapt the future RLM parameters. This solution enables an efficient way to perform radio link monitoring steadily upon configuring the future RLM parameters at the UE.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology "network node" is used. It can be any kind of network node which may comprise of a radio network node such as base station, radio base station, base transceiver station, base station controller, network controller, multi-standard radio BS, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

Furthermore, in some embodiments, the term "base station (BS)" may comprise, e.g., gNB, en-gNB or ng-eNB or a relay node, or any BS compliant with the embodiments. The term "radio node" used herein may be used to denote a UE or a radio network node. The term "signaling" used herein may comprise any of high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

In some embodiments, the term "RLM procedure" used herein may refer to any process occurs, or action taken by the UE during the RLM. Examples of such processes or actions are OOS evaluation, IS evaluation, filtering of IS/OOS (e.g. start of counters), triggering of RLF, start or expiration of RLF timer etc.

In some embodiments, the term "RLM performance" used herein may refer to any criteria or metric which characterizes the performance of the RLM performed by a radio node. Examples of RLM performance criteria are evaluation period over which the IS/OOS are detected, time period within which the UE transmitter is to be turned off upon expiration of RLF timer etc.

The term numerology here may comprise any one or a combination of: subcarrier spacing, number of subcarriers within a bandwidth, resource block size, symbol length, control plane (CP) length, etc. In one specific non-limiting example, numerology comprises subcarrier spacing of 7.5 kHz, 15 kHz, 30 kHz, 60 kHz, 120 kHz, or 240 kHz. In another example, numerology is the CP length which may be used with subcarrier spacing 30 kHz or larger.

In an example method performed in a UE, the present disclosure firstly addresses details about configuration/re-configuration of reference signal (RS) type. In the following embodiments, the term "RLM procedure" refers to both the procedure where the UE generates IS and OOS indications from measurements (L1 procedure) and the procedure where the UE uses these indications to increments the counters to start and stop the RLF timers. Hence, within the present disclosure, the term "RLM procedure" refers to both the L1 RLM procedure and the RLF procedure executed in RRC layer.

According to one embodiment, upon reconfiguring RLM parameters after the UE has already been configured to perform RLM, the UE can be triggered to perform the RLM either according to a first RLM mode (RLM1) or according to a second RLM mode (RLM2). In certain embodiments, the RLM parameters may be RLM-RS, BLER pair to generate IS/OOS indications, or both the RLM-RS and the BLER pair.

According to the first mode, RLM1, the UE may restart the RLM procedure. For example, the UE may abandon the ongoing RLM procedure by resetting all the RLM associated parameters, such as IS/OOS counters by setting these counters to zero, stopping or re-setting the RLF related timers, removing estimated DL quality measurements or removing estimated historic samples for IS/OOS evaluations and measurement performed based on the previously configured resources, etc. In certain embodiments, the IS/OOS counters may be N310, N311, N313 or N314. In certain embodiments, the RLF related timers may be T310, T311, or T313.

According to the second mode, RLM2, the UE may continue the ongoing RLM procedure. The UE may further be configured with the information regarding how the existing parameter values may be continued. For example, the UE may continue the ongoing RLM procedure without resetting all the RLM associated parameters, such as counters, timers, estimated DL quality, or estimated historic samples for IS/OOS evaluations etc. In certain embodiments, the counters may be N310, N311, N313 or N314. In certain embodiments, the timers may be T310, T311, or T313. The UE may be configured to reset or initialize only subset of the RLM associated parameters. For example, only reset RLF timer T310 but not RLM counters or vice versa. The details are provided for different cases, such as the cases in standard sections 5.2.1-5.2.3.

The UE may be triggered to perform the RLM according to RLM1 or RLM2 based on a pre-defined rule and/or based on information received from a network node. The received information may comprise a configuration message or an indication. In certain embodiments, the indication may be one of the pre-defined identifiers corresponding to the mode. Examples of configuration messages may be RRC signaling, MAC command, or Layer-1 message. In certain embodiments, the configuration messages may be sent over downlink (DL) control channel via downlink control information (DCI). The DL control channel may be PDCCH.

The UE may adapt a RLM procedure, depending on the type of change in RLM-RS. In one embodiment, the rule whether the UE may trigger RLM1 or RLM2 upon change in RLM-RS is dependent upon the type of reconfiguration of the RLM-RS. Examples of types of reconfiguration of the RLM-RS are an addition of one or more new RLM-RS; a replacement of one or more existing RLM-RS by new RLM-RS; a removal of one or more existing RLM-RS; and a complete replacement of all existing RLM-RS by new RLM-RS.

The UE behavior adaptation whether to apply RLM1 or RLM2 upon RLM-RS reconfiguration is described herein by means of examples below.

In the first scenario of one or more RLM RS resources being added to the set of RLM-RS resources, the size of the set of the RLM RS resources increases. The UE is currently configured with RLM-RS (RLM-RS1), and the UE is further configured with a new set of RLM-RS (e.g. RLM-RS2) for doing the RLM. The combined set of RLM-RS (RLM-RS3) comprising RLM-RS1 and RLM-RS2 is then used by the UE for doing the RLM.

In this case, the UE may apply the second RLM mode, RLM2 for doing the RLM, such as continuing doing the RLM while it may modify some of the existing RLM parameters' values as described below.

The UE may use one or any combination of the following rules:

(1) OOS indications being based on X+N evaluation results corresponding to X+N different RS s from the new set, where N is the number of new RLM RS resources;

(2) IS indications being based on Y (Y<X+N) evaluation results corresponding to Y different RSs from the new set;

(3) OOS-triggered timer (T310) needing to be extended depending on when the RRC reconfiguration is received;

(4) UE prioritizing evaluation of the new RLM RS resource; and (5) The UE behavior adaptation depending on the type of the new RLM RS resource.

In one embodiment, Y may be increased by at most N when N RLM RS resources are added. In another embodiment, the number Y remains unchanged (e.g., Y=1) but the IS indications are based on any RLM RS from the increased set whichever comes first.

In certain embodiments, the OOS-triggered timer may need to be extended to accommodate the time for at least M1<N (e.g., M1=1) out-of-sync evaluation periods to allow the evaluation based on one or more newly added RLM RSs and/or one or more. This rule may avoid RLF if the new RLM RS resource has a good link quality. In certain embodiments, the OOS-triggered timer may need to be extended to accommodate the time for at least M2 (e.g., M2=N311) in-sync evaluation periods.

In certain embodiments, UE prioritizing evaluation of the new RLM RS resource means that evaluating the new RLM RS resource before evaluating one, some or all RLM RS resources from the old set.

In certain embodiments, the UE may apply a first behavior (e.g., do not reset timers or counters) if the type of new RLM RS resource is SS/PBCH block. In certain embodiments, the UE may apply a second behavior (e.g., reset at least one timer or counter) if the type of new RLM RS resource is CSI-RS.

In the second scenario of replacing one or more RLM RS resources, the set size does not change. The UE is currently configured with RLM-RS (RLM-RS1), and part of RLM-RS1 is replaced with a new set of RLM-RS (e.g. RLM-RS2) for doing the RLM. The modified RLM-RS1 is called herein as RLM-RS1'. The combined set of RLM-RS (RLM-RS4) comprising RLM-RS1' and RLM-RS2 is then used by the UE for doing the RLM.

In this case, the UE may apply the second RLM mode, RLM2 for doing the RLM, for example, continuing doing the RLM while it may modify some of the existing RLM parameters' values as described below. According to another aspect of the second embodiment, if the number of RLM-RS2 is larger than certain threshold (e.g. 4 or more), then the UE may be configured to apply the first RLM mode, RLM1. In other words, the UE may restart the RLM parameters.

The new RLM RS resource compared to the replaced RLM RS resource may have at least one different characteristic. For example, RLM RS type, frequency, RLM RS bandwidth, RLM RS density in time and/or frequency, and RLM RS periodicity, etc.

The UE may use one or any combination of the following rules:

(1) OOS indications being based on the evaluation results based on RLM RS resources from the updated set;

(2) OOS-triggered timer (T310) needing to be extended depending on when the RRC reconfiguration is received to accommodate the time for at least M<N (e.g., M=1) out-of-sync evaluation periods to allow the evaluation based on one or more newly added RLM RSs;

(3) IS indications being based on Y evaluation results based on RLM RS resources from the updated set;

(4) UE prioritizing evaluations based on the new RLM RS resources; and (5) The UE behavior adaptation depending on the type of the old and/or new RLM RS resources.

In certain embodiments, basing on RLM RS resources from the updated set may mean excluding the replaced RLM RS resources and including the replacing (new) RLM RS resources.

In certain embodiments, OOS-triggered timer (T310) needing to be extended depending on when the RRC reconfiguration is received may allow to avoid RLF if the new RLM RS resource has a good link quality.

In certain embodiments, UE prioritizing evaluations based on the new RLM RS resources means that evaluating the channel quality for the new RLM RS resources before evaluating one, some or all RSs from the old set except for the deleted RLM RS resources.

In certain embodiments, the UE may apply a first behavior if the type has changed. In certain embodiments, the UE may apply a second behavior if the type of has not changed.

In the third scenario of one or more RLM RS resources in a number of L being removed, the size of the RLM RS resource set is reduced. The UE is currently configured with RLM-RS (RLM-RS1), and part or subset of RLM-RS1 is removed for doing the RLM. The remaining part of RLM-RS1 after removing the removal of the subset of RLM-RS1 is called herein as RLM-RSS. The reduced set of RLM-RS (RLM-RS5) is then used by the UE for doing the RLM.

In this case, the UE may apply the second RLM mode, RLM2 for doing the RLM, for example, continuing doing the RLM while it may modify some of the existing RLM parameters' values as described below. According to another aspect of this embodiment, if the number of the part of the RLM-RS1 removed is larger than certain threshold (e.g. 4 or more), then the UE may be configured to apply the first RLM mode, RLM1. In other words, the UE may restart the RLM parameters.

The UE may use one or any combination of the following rules:

(1) OOS indications being based on the evaluation results corresponding to the new (reduced) set of RLM RS resources; and (2) IS indications being based on evaluation results based on the new (reduced) set.

In certain embodiments, the evaluation results, which are completed or not, for the removed RS may not be counted into OOS and IS after the UE receives and applies the new RLM RS configuration.

In the fourth scenario of existing RLM RS resources being fully replaced, the existing RLM RS resource (RLM-RS1) is fully replaced with another new set of the RLM-RS (RLM-RS6), which is then used by the UE for doing the RLM. In this case, the UE may be configured based on pre-defined rule or based on indication to apply the first RLM mode, RLM1 for doing the RLM. This means that the UE may reset the values of the existing parameters which were used for doing RLM based on RLM-RS1.

According to yet another aspect of the rule, the UE may start doing RLM based on RLM-RS6 after completing one or more ongoing processes related to RLM based on RLM-RS1. Examples of the processes are in sync evaluation period, out of sync evaluation period etc.

In another example method performed in a UE, the present disclosure secondly addresses details about configuration/re-configuration of BLER pair. In the following embodiments, the UE may adapt its RLM procedure, depending on the type of change in BLER pair. In one embodiment, the rule whether the UE may trigger RLM1 or RLM2 upon change in BLER pair or not may be dependent upon the type of re-configuration of the BLER pair.

Each BLER value of the BLER pair is used to map to an SINR or other quality measurement and generate IS indications and OOS indications respectively. The method assumes that there is a set of BLER pairs that may be configured and re-configured by the network based on BLER pair index 1 comprising BLER IS(1) and BLER OOS(1); BLER pair index 2 comprising BLER IS(2) and BLER OOS(2); and so on until BLER pair index M comprising BLER IS(M) and BLER OOS(M).

Examples of types of reconfiguration of BLER pair are any change in BLER IS and BLER OOS change; BLER IS increasing and BLER OOS increasing; BLER IS decreasing and BLER OOS decreasing; BLER IS increasing and BLER OOS decreasing; and BLER IS decreasing and BLER OOS increasing.

In the fifth scenario of increasing in BLER OOS, an increase in BLER OOS indicates that from the moment the UE receives that configuration, it will tolerate lower SINR values before generating OOS, and it is understood that the purpose of the network is to have a more conservative RLF procedure where the UE does not increase the OOS counters unless the situation is much worse. Hence, upon receiving a configuration that increases the BLER OOS, the UE resets the OOS counter(s), such as N310, and stop the RLF related timers, such as T310 or T313, if running In certain embodiments, increasing the BLER OOS means increasing the $Q_{out}$ threshold, for example, from 10% to 20%.

In the sixth scenario of decreasing in BLER OOS, a decrease in BLER OOS indicates that from the moment the UE receives that configuration, it may start generating more OOS for the same SINR values, and it is understood that the purpose of the network is to have a less conservative RLF procedure where the UE may increase the OOS counters faster. Hence, upon receiving a configuration that decreases the BLER OOS, the UE may reset the OOS counter(s), such as N310, and stop the RLF related timers, such as T310 or T313, if running, so that RLF is not triggered too fast. In certain embodiments, decreasing the BLER OOS means decreasing the $Q_{out}$ threshold, for example, from 20% to 10%.

In the seventh scenario of increasing in BLER IS, an increase in BLER IS, i.e. $Q_{in}$ threshold, indicates that from the moment the UE receives that configuration, it will generate IS indications faster than with the previous configuration, so that it may quicker increase the counters (e.g. N311) that stops the RLF timer (e.g. T311), and it is understood that the purpose of the network is to quickly get out of an RLF situation, e.g. when RLF timer is running In other words, it may tolerate a BLER improvement less significant, e.g. if the increase is from 2% to 5%. In other words, the UE starts to generate IS indications when channel statistically starts to have BLER not lower than 5% instead of not lower than 2% which is more conservative. Hence, upon receiving a configuration that increases the BLER IS, the UE resets the IS counter(s), such as N311 or equivalent for secondary cell groups (SCGs), and stop the RLF related timers, e.g. T310, T311 or T313, if running.

In the eighth scenario of decreasing in BLER IS, a decrease in BLER IS, i.e. $Q_{in}$ threshold, indicates that from the moment the UE receives that configuration, it will generate IS indications slower, which is more conservatively than with the previous configuration, so that it may slower increase the counters (e.g. N311) that stops the RLF timer (e.g. T311), and it is understood that the purpose of the network is to avoid getting out of an RLF situation too fast, even though the service cannot be properly provided to the UE, for example, when RLF timer is running Hence, upon receiving a configuration that decreases the BLER IS, the UE resets the IS counter(s), such as N311 or equivalent for SCGs, and stop the RLF related timers (e.g. T310, T311 or T313), if running.

The present disclosure further comprises other scenarios which the example method may be applied to. Combinations of the first, second, and/or third scenarios may also occur one parameter has been changed for one RLM RS resource which is the second scenario, and also one new RLM RS resource was added which is the first scenario, so the combination of the corresponding rules may also apply here.

The present disclosure further illustrates UE behavior and RLM performance requirements during a transition period upon a change in the set of RLM-RS resources. Herein, the UE behavior is described and its expected performance during the change, shortly before and shortly after the change.

The UE may be required to comply with one or more RLM performance metrics, even right before the change, during the change, right after the change, and any one or more of which may comprise a transition period. In a further embodiment, this requirement may apply, disregard of whether any timer or counter is reset or not. In another embodiment, this requirement may apply only provided a counter like N310 is not reset. In certain embodiments, the one or more RLM performance metrics may be evaluation period, OOS or IS indication interval, and accuracy of the link quality measurement, such as SINR which is then mapped to BLER.

Figure 8:
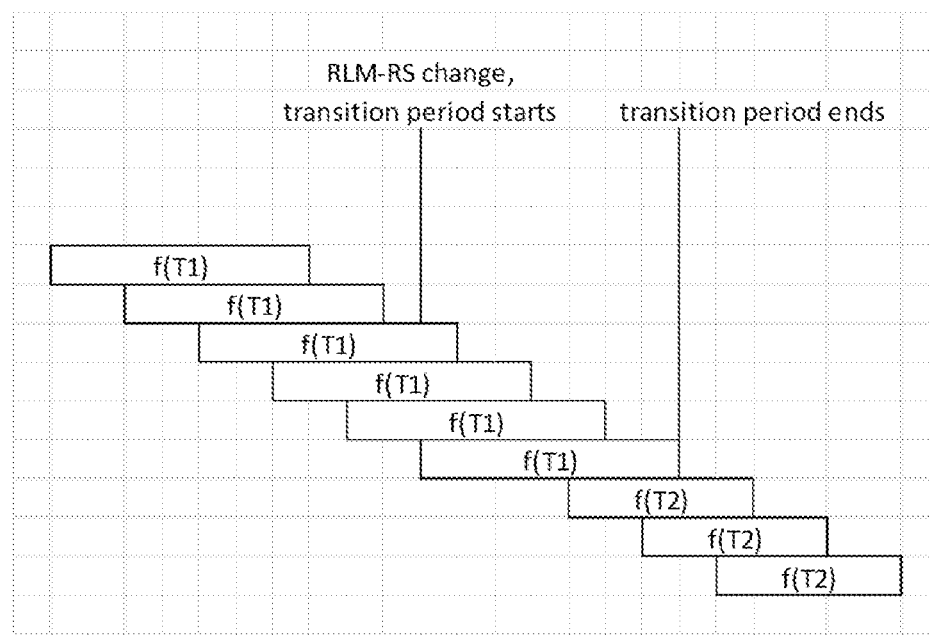
FIG. 8 illustrates an example transition period upon changing configuration of RLM-RS, according to certain embodiments.

FIG. 8 illustrates an example transition period upon changing configuration of RLM-RS resource or the set of RLM-RS resources, in accordance with certain embodiments. An evaluation period is determined based on a sliding window method which is similar to computing a running average, and in the end of each evaluation period, the UE physical layer may indicate OOS to higher layers, which ultimately may lead to RLF. During the transition period, the UE may comply with the most relaxed RLM performance metric (e.g., longest evaluation period) between the performance metric associated with the old RLM RS configuration and the performance metric associated with the new RLM RS configuration. The transition period may start from the time when the change is applied, or when the new configuration is received and last for one most relaxed evaluation period, or the longest RLM-RS periodicity among the configured old and new RLM-RS resources. The rule may apply for evaluation period per RLM-RS resource as well as for the evaluation period common for all configured RLM-RS resources. In one embodiment, the RLM-RS periodicity during time interval t1 is T1, and the evaluation period is a function f(T1), and the UE receives a shorter periodicity T2<T1 for this RLM-RS or even for another RLM-RS resource, which may make the longest periodicity among all configured RLM-RS resources shorter, the new evaluation period becomes a function of f(T2) which is smaller than f(T1), so during the transition time equal to g(max(T1,T2)) =g(T1), e.g, g(T1)=f(T1), from the moment when the change is configured, the UE may indicate to higher layer OOS one or more time based on the evaluation period f(T1), during which the UE assess the link quality of the RLM-RS. After the transition period, the evaluation period is f(T2).

The present disclosure further discloses an example method implemented in a network node. A network node implements the network side for the embodiments described herein. The network behavior is compliant with the UE embodiments, such configuring RLM parameters, timers, counters, and triggering RLF at the network side, etc.

For each of the above examples, a set of RLM-RS resources, e.g., L RLM-RS resources, may be either all SSB or all CSI-RS or a combination of SSB and CSI-RS resources. For the combination case, the rule may apply to the total group of L RLM-RS resources, or the SSB and CSI-RS resources are treated as separate subgroups and RLM is monitored per subgroup. That is, ISS/OOS indication may be generated per subgroup, or ISS/OOS may be generated over total group, even monitoring is done per subgroup. For both the aforementioned cases, any change listed above for the subgroup affects only the monitoring continuation over the subgroup, where a resource or resources are changed and where all cases listed above. For example, a UE is configured with L=7 resources out of which P=3 are SSB and T=4 are CSI-RS based. When one of the CSI-RS resources is changed, only monitoring from the group of CSI-RS based RLM-RS is affected as per information from network or as per predefined rule. The CSI-RS based group may further be divided into resources that share same or different configured bandwidth part (BWP), and these subgroups are treated as described for SSB and CSI-RS subgroups. There may be a rule that when CSI-RS resource is changed, the monitoring behavior only changes within the group of CSI-RS resources configured for the same BWP. Further, the total group of L SSB or CSI-RS based RLM-RS may be divided into subgroups based on BWP, such that all resources within one BWP belong to one group.

In the first embodiment of a method performed in a network node, the UE deletes measurement, stops timers and resets counters when network configures the UE with a RLM configuration. The first embodiment provides updates to the 38.331 for some of the embodiments in the present disclosure.

In the first embodiment, regarding radio source configuration, the UE shall:
1> if the received radioResourceConfigDedicated includes the rlm-Config:
2> reconfigure the radio link monitoring parameters as specified in 5.3.10.x.

In the first embodiment, regarding radio link monitoring parameters reconfiguration, the UE shall:
1> if the received the rlm-Config contains ssbResourcesToAddModList;
2> for each ssbIndex value included in the ssbResourcesToAddModList;
3> if an entry with the matching ssbIndex exists in the ssbResourcesToAddModList;
4> add a new entry for the received ssbIndex to the ssbResourcesToAddModList;
1> if the received the rlm-Config contains csi-RS-ResourcesToAddModList;

2> for each csi-rs-Index value included in the csi-RS-ResourcesToAddModList;
   3> if an entry with the matching csi-rs-Index exists in the csi-RS-ResourcesToAddModList;
      4> add a new entry for the received csi-rs-Index to the csi-RS-ResourcesToAddModList;
1> if the received the rlm-Config contains ssbResourcesToRemoveList;
  2> for each ssbIndex value included in the ssbResourcesToAddModList;
   3> remove the entry with the matching ssbIndex from the ssbResourcesToAddModList;
1> if the received the rlm-Config contains csi-RS-ResourcesToRemoveList;
  2> for each csi-rs-Index value included in the csi-RS-ResourcesToRemoveList;
   3> remove the entry with the matching csi-rs-Index from the csi-RS-ResourcesToRemoveList;
1> if the received the rlm-Config contains RLM-IS-OOS-threhsoldConfig;
  2> reconfigure the BLER pair threshold according to the received index in RLM-IS-OOS-threhsoldConfig, where the index mapping to the BLER pair is specified in TS 38.211;
1> stop the timers T310, T312, T313 and any other RLF related timer or failure related timer that can be affected by RLM parameters;
1> clear the RLF counters N310, N311, N313, N314 or any other counter for IS and OOS indications from lower layers that might be affected by the RLM configuration;
1> clear the information included in VarRLF-Report, if any.

In the second embodiment of a method performed in a network node, the UE only resets RLF related counters and deletes measurements when some specific RLM re-configuration is performed. For example, the UE resets RLF related counters only when the BLER pair is provided, wherein the BLER pair is an indication that the UE is being re-configured. The second embodiment provides updates to the 38.331 for some of the embodiments in the present disclosure.

In the second embodiment, regarding radio source configuration, the UE shall:
1> if the received radioResourceConfigDedicated includes the rlm-Config:
  2> reconfigure the radio link monitoring parameters as specified in 5.3.10.x.

In the second embodiment, regarding radio link monitoring parameters reconfiguration, the UE shall:
1> if the received the rlm-Config contains ssbResourcesToAddModList;
  2> for each ssbIndex value included in the ssbResourcesToAddModList;
   3> if an entry with the matching ssbIndex exists in the ssbResourcesToAddModList;
      4> add a new entry for the received ssbIndex to the ssbResourcesToAddModList;
1> if the received the rlm-Config contains csi-RS-ResourcesToAddModList;
  2> for each csi-rs-Index value included in the csi-RS-ResourcesToAddModList;
   3> if an entry with the matching csi-rs-Index exists in the csi-RS-ResourcesToAddModList;
      4> add a new entry for the received csi-rs-Index to the csi-RS-ResourcesToAddModList;
1> if the received the rlm-Config contains ssbResourcesToRemoveList;
  2> for each ssbIndex value included in the ssbResourcesToAddModList;
   3> remove the entry with the matching ssbIndex from the ssbResourcesToAddModList;
1> if the received the rlm-Config contains csi-RS-ResourcesToRemoveList;
  2> for each csi-rs-Index value included in the csi-RS-ResourcesToRemoveList;
   3> remove the entry with the matching csi-rs-Index from the csi-RS-ResourcesToRemoveList;
1> if the received the rlm-Config contains RLM-IS-OOS-threhsoldConfig;
  2> reconfigure the BLER pair threshold according to the received index in RLM-IS-OOS-threhsoldConfig, where the index mapping to the BLER pair is specified in TS 38.211;
  2> stop the timers T310, T312, T313 and any other RLF related timer or failure related timer that can be affected by RLM parameters;
  2> clear the RLF counters N310, N311, N313, N314 or any other counter for IS and OOS indications from lower layers that might be affected by the RLM configuration;
  2> clear the information included in VarRLF-Report, if any.

In the third embodiment of a method performed in a network node, the UE only resets RLF related counters and deletes measurements when some specific RLM re-configuration is performed. For example, the UE resets RLF related counters only when any of the RS type resources are being added, i.e. the UE does not reset counters or stop timers when RS resources are removed. The third embodiment provides updates to the 38.331 for some of the embodiments in the present disclosure.

In the third embodiment, regarding radio source configuration, the UE shall:
1> if the received radioResourceConfigDedicated includes the rlm-Config:
  2> reconfigure the radio link monitoring parameters as specified in 5.3.10.x.

In the third embodiment, regarding radio link monitoring parameters reconfiguration, the UE shall:
1> if the received the rlm-Config contains ssbResourcesToAddModList;
  2> for each ssbIndex value included in the ssbResourcesToAddModList;
   3> if an entry with the matching ssbIndex exists in the ssbResourcesToAddModList;
      4> add a new entry for the received ssbIndex to the ssbResourcesToAddModList;
      4> stop the timers T310, T312, T313 and any other RLF related timer or failure related timer that can be affected by RLM parameters;
      4> clear the RLF counters N310, N311, N313, N314 or any other counter for IS and OOS indications from lower layers that might be affected by the RLM configuration;
      4> clear the information included in VarRLF-Report, if any;
1> if the received the rlm-Config contains csi-RS-ResourcesToAddModList;
  2> for each csi-rs-Index value included in the csi-RS-ResourcesToAddModList;
   3> if an entry with the matching csi-rs-Index exists in the csi-RS-ResourcesToAddModList;

4> add a new entry for the received csi-rs-Index to the csi-RS-ResourcesToAddModList;
4> stop the timers T310, T312, T313 and any other RLF related timer or failure related timer that can be affected by RLM parameters;
4> clear the RLF counters N310, N311, N313, N314 or any other counter for IS and OOS indications from lower layers that might be affected by the RLM configuration;
4> clear the information included in VarRLF-Report, if any;
1> if the received the rlm-Config contains ssbResourcesToRemoveList;
2> for each ssbIndex value included in the ssbResourcesToAddModList;
3> remove the entry with the matching ssbIndex from the ssbResourcesToAddModList;
1> if the received the rlm-Config contains csi-RS-ResourcesToRemoveList;
2> for each csi-rs-Index value included in the csi-RS-ResourcesToRemoveList;
3> remove the entry with the matching csi-rs-Index from the csi-RS-ResourcesToRemoveList;
1> if the received the rlm-Config contains RLM-IS-OOS-threhsoldConfig;
2> reconfigure the BLER pair threshold according to the received index in RLM-IS-OOS-threhsoldConfig, where the index mapping to the BLER pair is specified in TS 38.211.

In the fourth embodiment of a method performed in a network node, the UE only resets RLF related counters and deletes measurements when some specific RLM re-configuration is performed. For example, the UE resets RLF related counters only when any of the RS type resources are being removed, i.e. the UE does not reset counters or stop timers when RS resources are added. The fourth embodiment provides updates to the 38.331 for some of the embodiments in the present disclosure.

In the fourth embodiment, regarding radio source configuration, the UE shall:
1> if the received radioResourceConfigDedicated includes the rlm-Config:
2> reconfigure the radio link monitoring parameters as specified in 5.3.10.x.

In the fourth embodiment, regarding radio link monitoring parameters reconfiguration, the UE shall:
1> if the received the rlm-Config contains ssbResourcesToAddModList;
2> for each ssbIndex value included in the ssbResourcesToAddModList;
3> if an entry with the matching ssbIndex exists in the ssbResourcesToAddModList;
4> add a new entry for the received ssbIndex to the ssbResourcesToAddModList;
4> stop the timers T310, T312, T313 and any other RLF related timer or failure related timer that can be affected by RLM parameters;
4> clear the RLF counters N310, N311, N313, N314 or any other counter for IS and OOS indications from lower layers that might be affected by the RLM configuration;
4> clear the information included in VarRLF-Report, if any;
1> if the received the rlm-Config contains csi-RS-ResourcesToAddModList;
2> for each csi-rs-Index value included in the csi-RS-ResourcesToAddModList;
3> if an entry with the matching csi-rs-Index exists in the csi-RS-ResourcesToAddModList;
4> add a new entry for the received csi-rs-Index to the csi-RS-ResourcesToAddModList;
1> if the received the rlm-Config contains ssbResourcesToRemoveList;
2> for each ssbIndex value included in the ssbResourcesToAddModList;
3> remove the entry with the matching ssbIndex from the ssbResourcesToAddModList;
3> stop the timers T310, T312, T313 and any other RLF related timer or failure related timer that can be affected by RLM parameters;
3> clear the RLF counters N310, N311, N313, N314 or any other counter for IS and OOS indications from lower layers that might be affected by the RLM configuration;
3> clear the information included in VarRLF-Report, if any;
1> if the received the rlm-Config contains csi-RS-ResourcesToRemoveList;
2> for each csi-rs-Index value included in the csi-RS-ResourcesToRemoveList;
3> remove the entry with the matching csi-rs-Index from the csi-RS-ResourcesToRemoveList;
3> stop the timers T310, T312, T313 and any other RLF related timer or failure related timer that can be affected by RLM parameters;
3> clear the RLF counters N310, N311, N313, N314 or any other counter for IS and OOS indications from lower layers that might be affected by the RLM configuration;
3> clear the information included in VarRLF-Report, if any;
1> if the received the rlm-Config contains RLM-IS-OOS-threhsoldConfig;
2> reconfigure the BLER pair threshold according to the received index in RLM-IS-OOS-threhsoldConfig, where the index mapping to the BLER pair is specified in TS 38.211.

Figure 9:
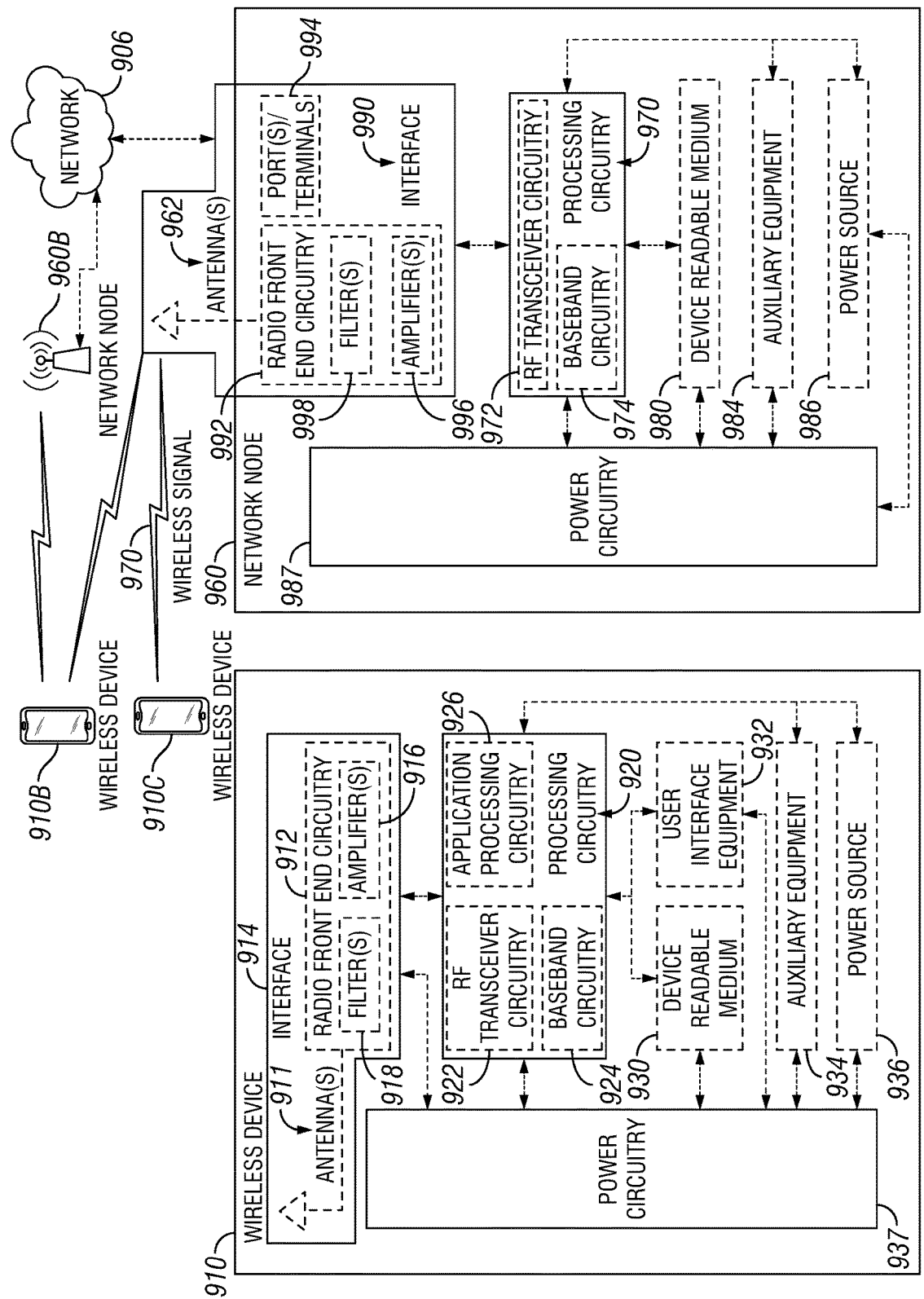
FIG. 9 illustrates an example wireless network, according to certain embodiments.

FIG. 9 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960*b*, and wireless devices (WDs) 910, 910*b*, and 910*c*. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. In some embodiments, the network node 960 may be a base station, such as gNB. In certain embodiments, the wireless device 910 may be a user equipment, which is further illustrated in FIG. 19. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 988, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signaling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 910 may be a user equipment which is further depicted in FIGS. 9 and 19. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein. In particular embodiments, the processing circuitry 920 of the wireless device 910 may perform the method which is further illustrated in FIG. 18.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionalities described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
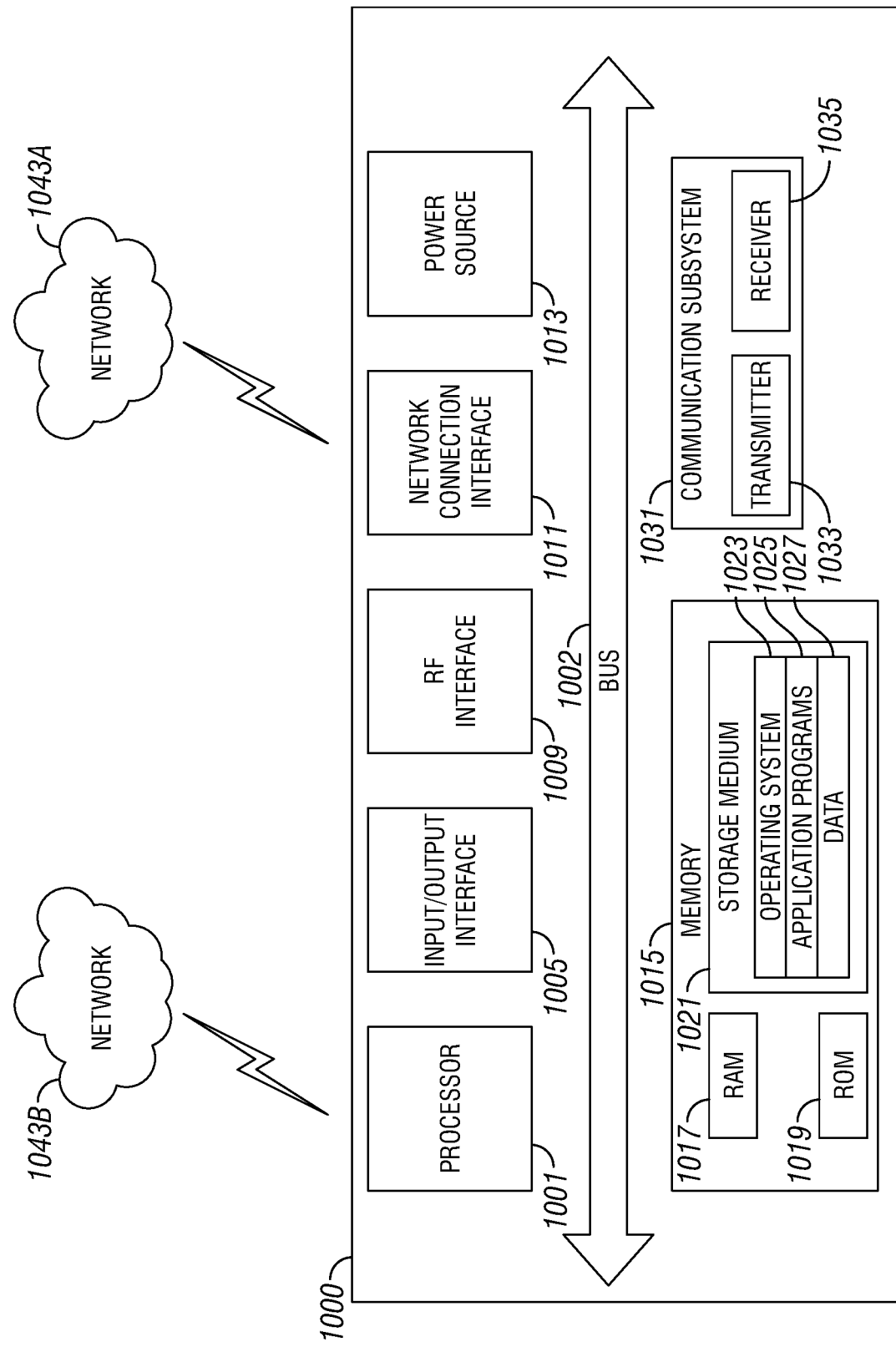
FIG. 10 illustrates an example user equipment, according to certain embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the 3rd Generation Partnership Project (3GPP), including a NB-IoT UE, a MTC UE, and/or an enhanced MTC (eMTC) UE. UE 1000, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 1000 may be a user equipment which is further depicted in FIG. 19. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043*a*. Network 1043*a* may encompass wired and/or wireless networks such as a local-area network (LAN), a wide-area network (WAN), a computer network, a wireless network, a telecommunications network, another like network or any combination thereof. For example, network 1043*a* may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
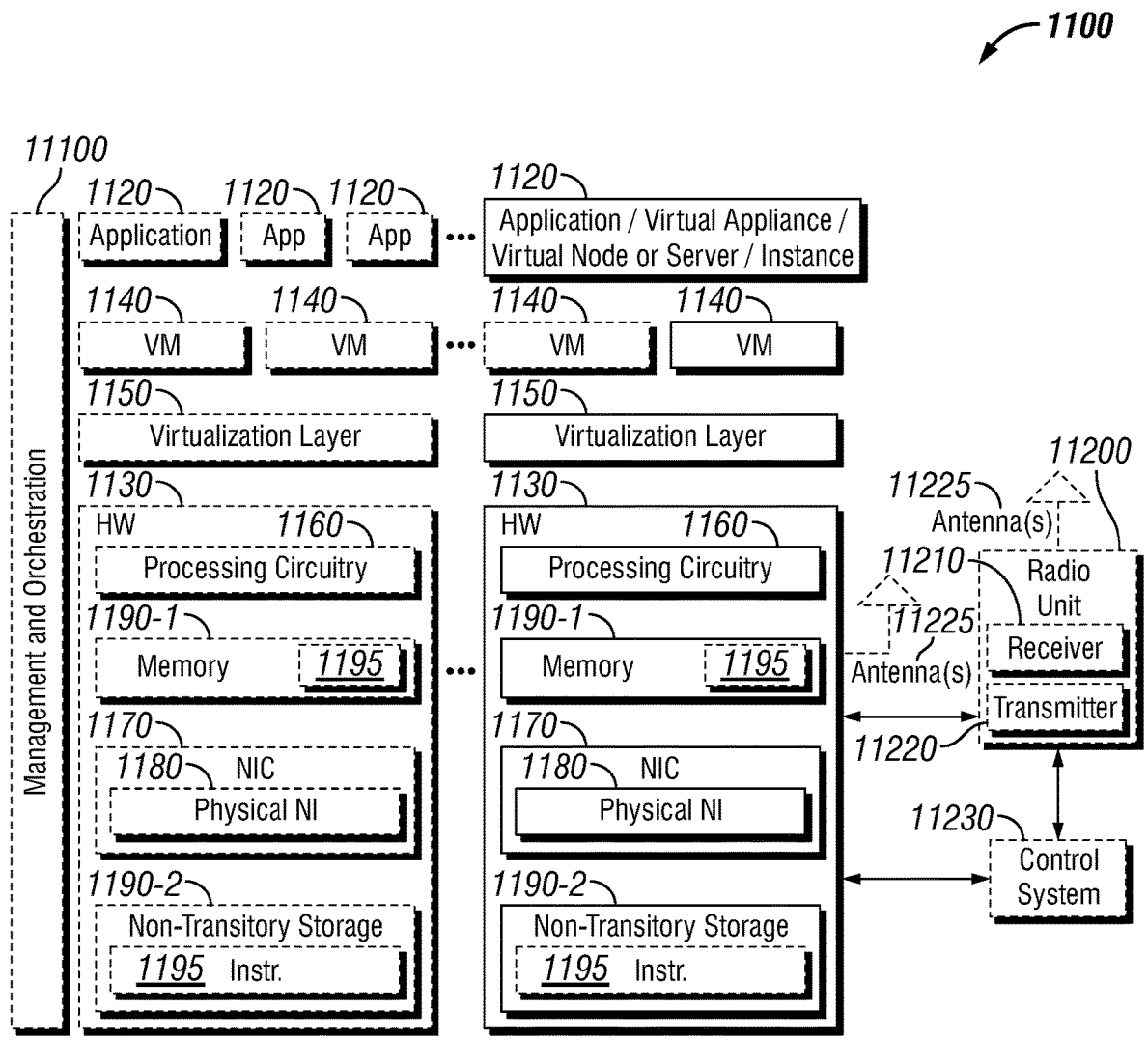
FIG. 11 illustrates an example virtualization environment, according to certain embodiments.

FIG. 11 illustrates an example virtualization environment, according to certain embodiments. FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signaling can be affected with the use of control system 11230 which may alternatively be used for communication between the hardware nodes 1130 and radio units 11200.

Figure 12:
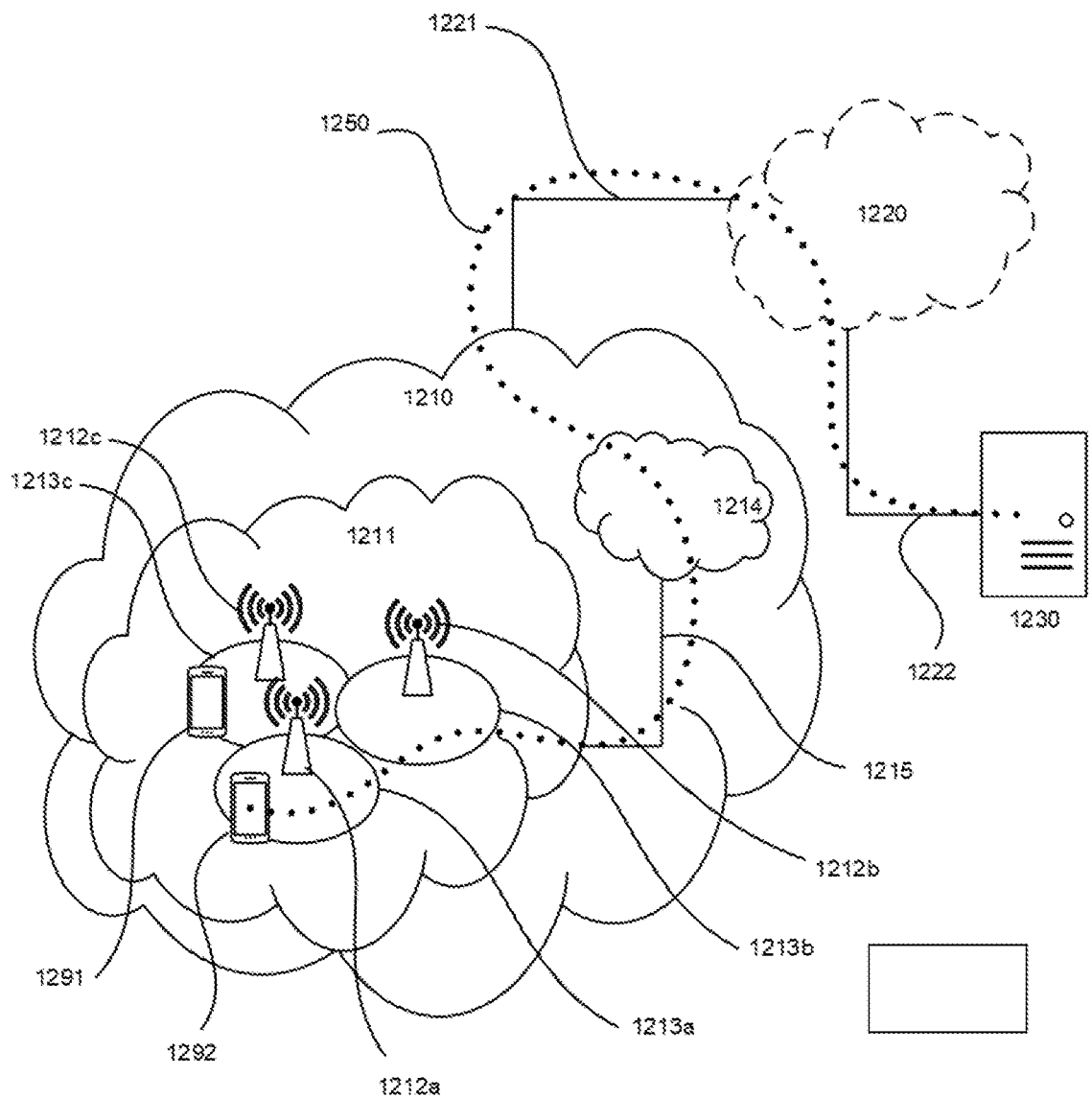
FIG. 12 illustrates an example telecommunication network connected via an intermediate network to a host computer, according to certain embodiments.

FIG. 12 illustrates an example telecommunication network connected via an intermediate network to a host computer, according to certain embodiments. With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212. In certain embodiments, the plurality of UEs 1291, 1292 may be the user equipment as described with respect to FIG. 19.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
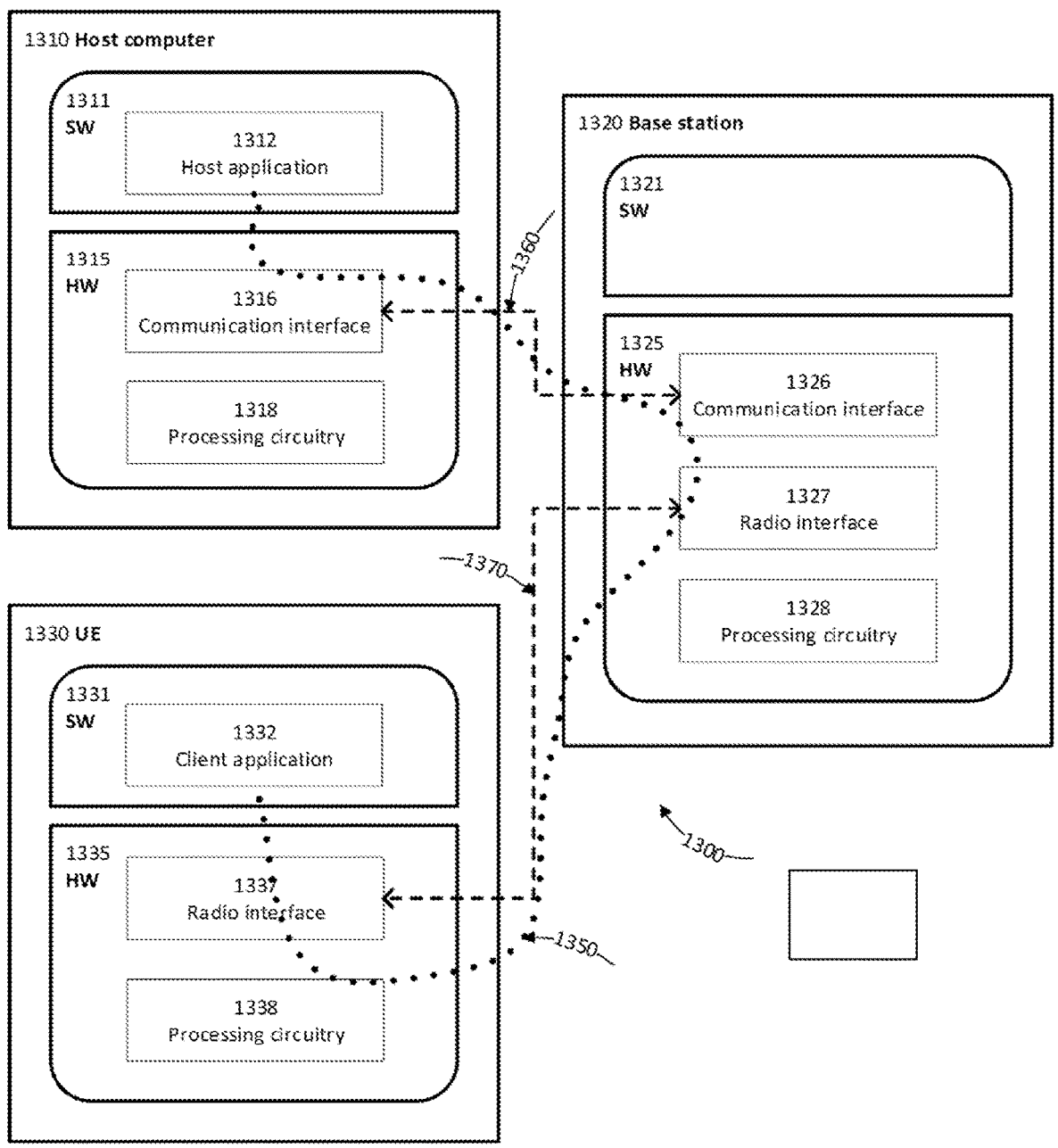
FIG. 13 illustrates an example host computer communicating via a base station with a user equipment over a partially wireless connection, according to certain embodiments.

FIG. 13 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. In certain embodiments, the UE 1330 may be the user equipment as described with respect to FIG. 19. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
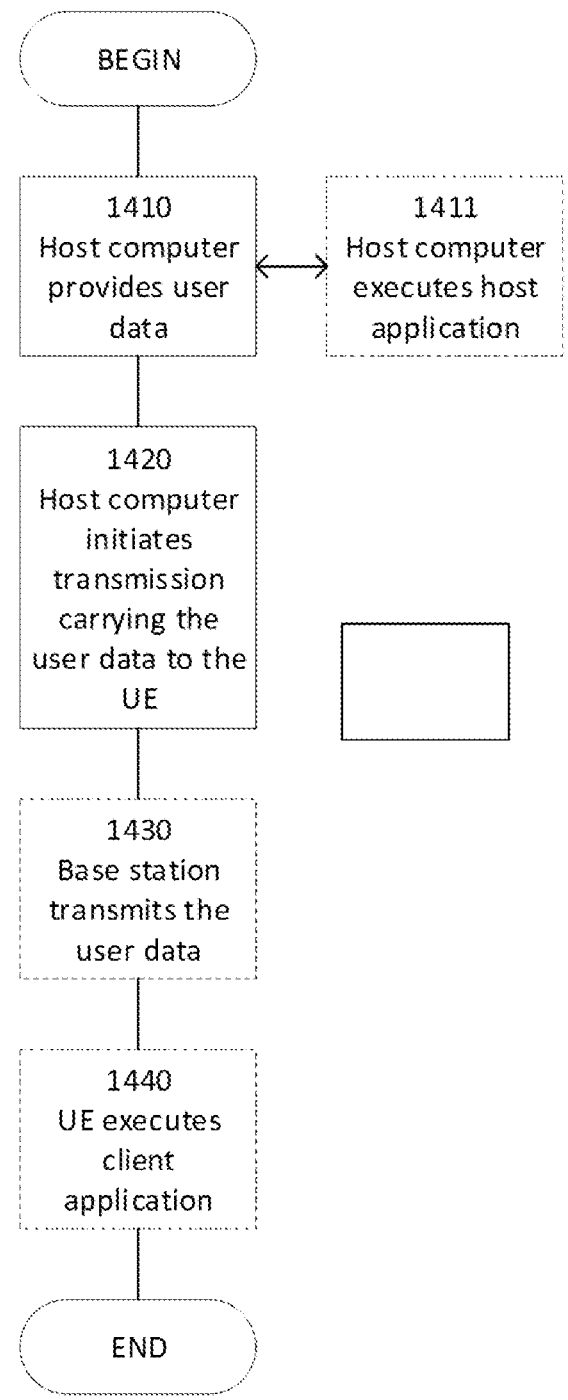
FIG. 14 illustrates an example method implemented in a communication system including a host computer, a base station and a user equipment, according to certain embodiments.

FIG. 14 illustrates an example method implemented in a communication system including a host computer, a base station and a user equipment, according to certain embodiments in accordance with some embodiments. More specifically, FIG. 14 is a flowchart illustrating a method implemented in a communication system, in accordance with one embodiment. The communication system includes a host computer, a base station and a UE which may be a user equipment described with reference to FIG. 19. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
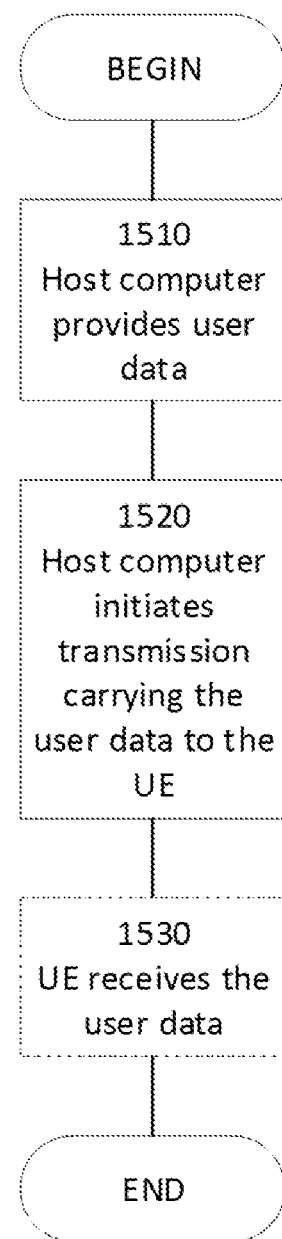
FIG. 15 illustrates another example method implemented in a communication system including a host computer, a base station and a user equipment, according to certain embodiments.

FIG. 15 illustrates an example method implemented in a communication system including a host computer, a base station and a user equipment, in accordance with some embodiments. More specifically, FIG. 15 is a flowchart illustrating a method implemented in a communication system, in accordance with one embodiment. The communication system includes a host computer, a base station and a UE which may be a user equipment described with reference to FIG. 19. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
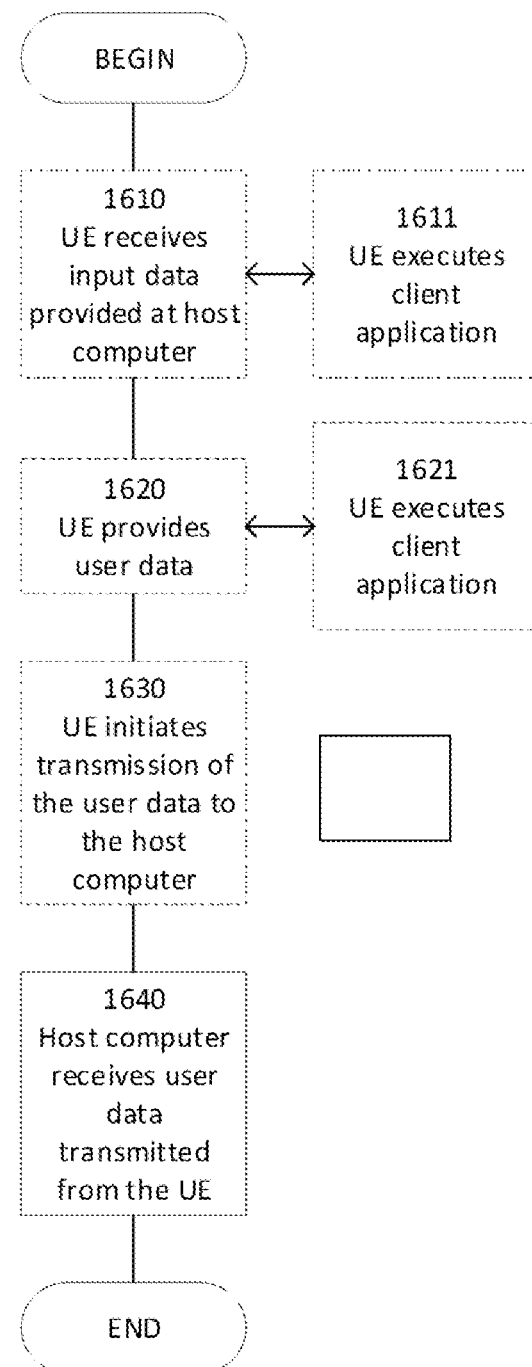
FIG. 16 illustrates another further example method implemented in a communication system including a host computer, a base station and a user equipment, according to certain embodiments.

FIG. 16 illustrates another further example method implemented in a communication system including a host computer, a base station and a user equipment, in accordance with some embodiments. More specifically, FIG. 16 is a flowchart illustrating a method implemented in a communication system, in accordance with one embodiment. The communication system includes a host computer, a base station and a UE which may be a user equipment described with reference to FIG. 19. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
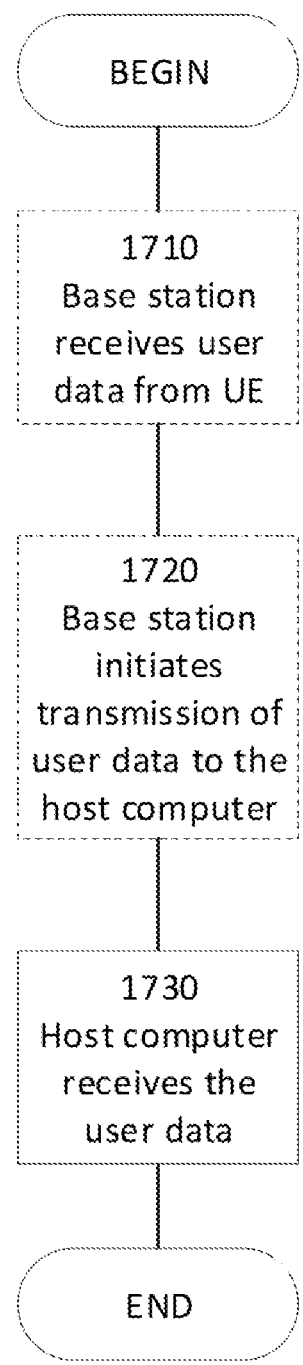
FIG. 17 illustrates another yet example method implemented in a communication system including a host computer, a base station and a user equipment, according to certain embodiments.

FIG. 17 illustrates another example method implemented in a communication system including a host computer, a base station and a user equipment, in accordance with some embodiments. More specifically, FIG. 17 is a flowchart illustrating a method implemented in a communication system, in accordance with one embodiment. The communication system includes a host computer, a base station and a UE which may be a user equipment described with reference to FIG. 19. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
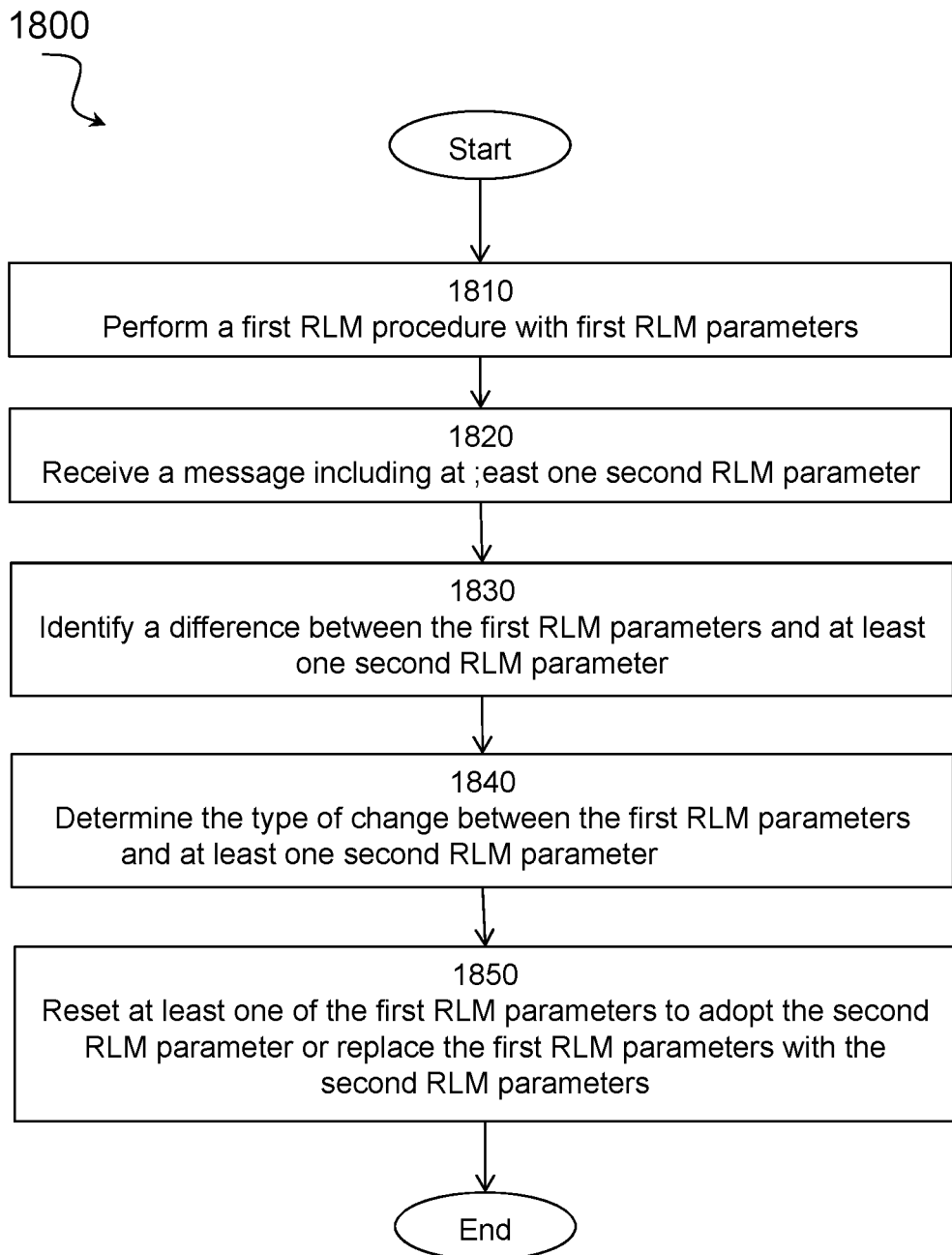
FIG. 18 illustrates a flow diagram of an example method in a user equipment, in accordance with certain embodiments.

FIG. 18 is a flow diagram of another example method performed at a user equipment, in accordance with certain embodiments. Method 1800 begins at step 1810 with the UE performing a RLM procedure with first RLM parameters.

At step 1820, the method 1800 comprises receiving, from a network node, a message including at least one second RLM parameter. In certain embodiments, the first RLM parameters and the second RLM parameter are RLM reference signal (RLM-RS) resources for in sync and out of sync indications, block error rate (BLER) for in-sync and out-of-sync indications, or a combination of RLM-RS resources and BLER for in-sync and out-of-sync indications.

At step 1830, the method 1800 comprises identifying a difference between the first RLM parameters and the at least one second RLM parameter. In certain embodiments, the method 1800 may comprise identifying that the first RLM parameters are a first group of RLM-RS resources, and identifying that the at least one second RLM parameter is a second group of RLM-RS resources added to the first group of RLM-RS resources. In certain embodiments, the method 1800 may comprise identifying that the first RLM parameter is a first group of RLM-RS resources, and identifying that the at least one second RLM parameter is a second group of RLM-RS resources that replace a subset of the first group of RLM-RS resources. In certain embodiments, the method 1800 may comprise identifying that the first RLM parameter is a first group of RLM-RS resources, and identifying that the at least one second RLM parameter is a second group of RLM-RS resources comprising the first group of RLM-RS resources without a subset of RLM-RS resources. In certain embodiments, the method 1800 may comprise identifying that the first RLM parameter is a first group of RLM-RS resources, and identifying that the at least one second RLM parameter is a second group of RLM-RS resources which replace the first group of RLM-RS resources. In certain embodiments, the method 1800 may comprise identifying that the at least one second RLM parameter increases a BLER threshold to generate the out-of-sync indications. In certain embodiments, the method 1800 may comprise identifying that the at least one second RLM parameter decreases a BLER threshold to generate the out-of-sync indications. In certain embodiments, the method 1800 may comprise identifying that the at least one second RLM parameter increases a BLER threshold to generate the in-sync indications. In certain embodiments, the method 1800 may comprise identifying that the at least one second RLM parameter decreases a BLER threshold to generate the in-sync indications.

At step 1840, the method 1800 comprises determining the type of change between the first RLM parameters and the second RLM parameter. In certain embodiments, the method 1800 may comprise determining that whether the first group of RLM-RS resources is the same type of RLM-RS resources as the second group of RLM-RS resources or not.

At step 1850, the method 1800 comprises resetting at least one of the first RLM parameters in response to identifying the difference between the first RLM parameters and the second RLM parameter. In certain embodiments, the method 1800 may comprise resetting at least one out-of-sync counter in response to the second RLM parameter increasing or decreasing a BLER threshold to generate the out-of-sync indications. In certain embodiments, the method 1800 may comprise resetting at least one in-sync counter in response to the second RLM parameter increasing or decreasing a BLER threshold to generate the in-sync indications. In certain embodiments, the method 1800 may comprise resetting at least one timer or counter when the first group of RLM-RS resources is the same type of RLM-RS resources as the second group of RLM-RS resources. In certain embodiments, the method 1800 may comprise not resetting any timers or counters when the first group of RLM-RS resources is not the same type of RLM-RS resources as the second group of RLM-RS resources.

In certain embodiment, the method 1800 may further comprise adapting the first group of the RLM-RS resources and the added second group of RLM-RS resources. In certain embodiment, the method 1800 may further comprise adapting the partly-replaced first group of the RLM-RS resources and the replacing second group of RLM-RS resources. In certain embodiments, the method 1800 may further comprise adapting the first group of RLM-RS resources without the subset of RLM-RS resources. In certain embodiments, the method 1800 may further comprise adapting the second group of RLM-RS resources. In certain embodiments, the method 1800 may further comprise stopping at least one radio link failure (RLF) related timer.

Figure 19:
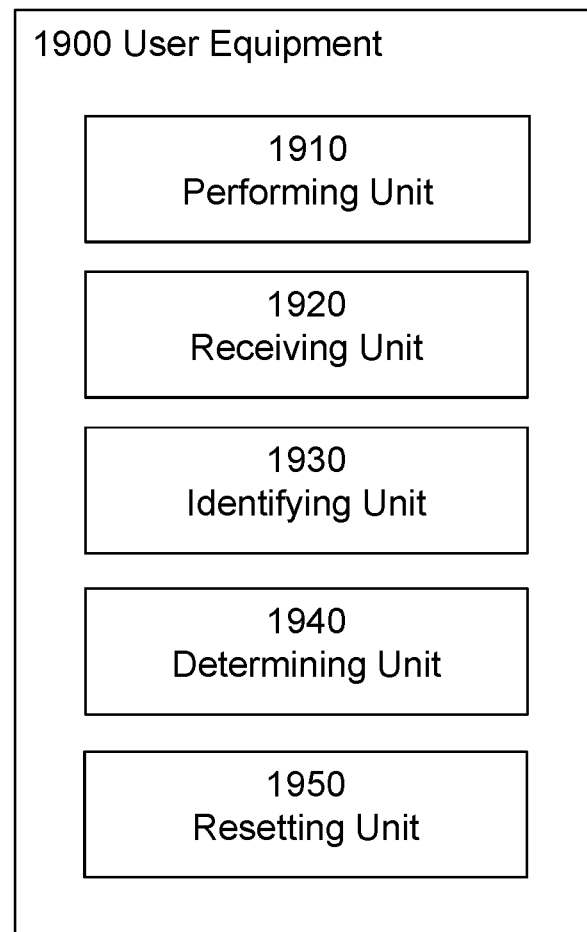
FIG. 19 illustrates a block schematic of an example user equipment, in accordance with certain embodiments.

FIG. 19 is a schematic block diagram of an exemplary user equipment, in accordance with certain embodiments. The user equipment 1900 may be used in a wireless network (for example, the wireless network 906 shown in FIG. 9). The user equipment 1900 may be implemented in a wireless device 910 shown in FIG. 9. User equipment 1900 is operable to carry out the example methods described with reference to FIG. 18 and possibly any other processes or methods disclosed herein. It is also to be understood that the method in FIG. 18 is not necessarily carried out solely by user equipment 1900. At least some operations of the method can be performed by one or more other entities.

User equipment 1900 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 1900 may be the processing circuitry 920 shown in FIG. 9. In some embodiments, the processing circuitry of user equipment 1900 may be the processor 1001 shown in FIG. 10. The processing circuitry may be configured to execute program code stored in memory 1015 shown in FIG. 10, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause performing unit 1910, receiving unit 1920, identifying unit 1930, determining unit 1940, and resetting unit 1950, and any other suitable units of user equipment 1900 to perform corresponding functions according one or more embodiments of the present disclosure, such as a transmitter and a receiver.

As illustrated in FIG. 19, user equipment 1900 includes performing unit 1910, receiving unit 1920, identifying unit 1930, determining unit 1940, and resetting unit 1950. The performing unit 1910 may be configured to perform a RLM procedure with first RLM parameters.

The receiving unit 1920 may be configured to receive, from a network node, a message including at least one second RLM parameter. In certain embodiments, the first RLM parameters and the second RLM parameter are RLM reference signal (RLM-RS) resources for in sync and out of sync indications, block error rate (BLER) for in-sync and out-of-sync indications, or a combination of RLM-RS resources and BLER for in-sync and out-of-sync indications.

The identifying unit 1930 may be configured to identify a difference between the first RLM parameters and the at least one second RLM parameter. In certain embodiments, the identifying unit 1930 may be configured to identify that the first RLM parameters are a first group of RLM-RS resources, and to identify that the at least one second RLM parameter is a second group of RLM-RS resources added to the first group of RLM-RS resources. In certain embodiments, the identifying unit 1930 may be configured to identify that the first RLM parameter is a first group of RLM-RS resources, and to identify that the at least one second RLM parameter is a second group of RLM-RS resources that replace a subset of the first group of RLM-RS resources. In certain embodiments, the identifying unit 1930 may be configured to identify that the first RLM parameter is a first group of RLM-RS resources, and to identify that the at least one second RLM parameter is a second group of RLM-RS resources comprising the first group of RLM-RS resources without a subset of RLM-RS resources. In certain embodiments, the identifying unit 1930 may be configured to identify that the first RLM parameter is a first group of RLM-RS resources, and to identify that the at least one second RLM parameter is a second group of RLM-RS resources which replace the first group of RLM-RS resources. In certain embodiments, the identifying unit 1930 may be configured to identify that the at least one second RLM parameter increases a BLER threshold to generate the out-of-sync indications. In certain embodiments, the identifying unit 1930 may be configured to identify that the at least one second RLM parameter decreases a BLER threshold to generate the out-of-sync indications. In certain embodiments, the identifying unit 1930 may be configured to identify that the at least one second RLM parameter increases a BLER threshold to generate the in-sync indications. In certain embodiments, the identifying unit 1930 may be configured to identify that the at least one second RLM parameter decreases a BLER threshold to generate the in-sync indications.

The determining unit 1940 may be configured to determine the type of change between the first RLM parameters and the second RLM parameter. In certain embodiments, the determining unit 1940 may be configured to determine that whether the first group of RLM-RS resources is the same type of RLM-RS resources as the second group of RLM-RS resources or not.

The resetting unit 1950 may be configured to reset at least one of the first RLM parameters in response to identifying the difference between the first RLM parameters and the second RLM parameter. In certain embodiments, the resetting unit 1950 may be configured to reset at least one out-of-sync counter in response to the second RLM parameter increasing or decreasing a BLER threshold to generate the out-of-sync indications. In certain embodiments, the resetting unit 1950 may be configured to reset at least one in-sync counter in response to the second RLM parameter increasing or decreasing a BLER threshold to generate the in-sync indications. In certain embodiments, the resetting unit 1950 may be configured to reset at least one timer or counter when the first group of RLM-RS resources is the same type of RLM-RS resources as the second group of RLM-RS resources. In certain embodiments, the resetting unit 1950 may be configured not to reset any timers or counters when the first group of RLM-RS resources is not the same type of RLM-RS resources as the second group of RLM-RS resources.

In certain embodiment, the UE 1900 may further be configured to adapt the first group of the RLM-RS resources and the added second group of RLM-RS resources. In certain embodiment, the UE 1900 may further be configured to adapt the partly-replaced first group of the RLM-RS resources and the replacing second group of RLM-RS resources. In certain embodiments, the UE 1900 may further be configured to adapt the first group of RLM-RS resources without the subset of RLM-RS resources. In certain embodiments, the UE 1900 may further be configured to adapt the second group of RLM-RS resources. In certain embodiments, the UE 1900 may further be configured to stop at least one radio link failure (RLF) related timer.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that providing a steady and continuous radio link monitoring upon configuring the UE by identifying a difference between the current RLM parameters and the future RLM parameters, so that the UE may be configured to adapt the future RLM parameters by adapting the difference while performing the current RLM parameters.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for performing radio link monitoring comprising:
   performing, by a user equipment (UE), a radio link monitoring (RLM) procedure with first RLM parameters;
   receiving, at the UE, a message including at least one second RLM parameter, wherein the first RLM parameters and the at least one second RLM parameter are RLM reference signal, RLM-RS, resources for in sync and out of sync indications;
   identifying, by the UE, a difference between the first RLM parameters and the at least one second RLM parameter, wherein identifying the difference between the first RLM parameters and the at least one second RLM parameter comprises:
      identifying that the first RLM parameters are a first group of RLM-RS resources, and
      identifying that the at least one second RLM parameter is a second group of RLM-RS resources added to the first group of RLM-RS resources;
   resetting, at the UE, at least one of the first RLM parameters in response to identifying the difference between the first RLM parameters and the at least one second RLM parameter and
   evaluating, by the UE, the first and second groups of RLM-RS resources by evaluating the second group of RLM-RS resourced before evaluating the first group of RLM-RS resources.

2. The method according to claim 1, wherein the first RLM parameters and the at least one second RLM parameter are a combination of RLM-RS resources and BLER for in-sync and out-of-sync indications.

3. The method according to claim 1, further comprising adapting the first group of the RLM-RS resources and the added second group of RLM-RS resources.

4. The method according to claim 1, wherein identifying the difference between the first RLM parameters and the at least one second RLM parameter comprises:
   identifying that the first RLM parameters are a first group of RLM-RS resources; and
   identifying that the at least one second RLM parameter is a second group of RLM-RS resources that replace a subset of the first group of RLM-RS resources.

5. The method according to claim 4, further comprising adapting the partly-replaced first group of the RLM-RS resources and the replacing second group of RLM-RS resources.

6. The method according to claim 1, wherein identifying the difference between the first RLM parameters and the at least one second RLM parameter comprises:
   identifying that the first RLM parameters are a first group of RLM-RS resources; and
   identifying that the at least one second RLM parameter is a second group of RLM-RS resources comprising the first group of RLM-RS resources without a subset of RLM-RS resources.

7. The method according to claim 6, further comprising adapting the first group of RLM-RS resources without the subset of RLM-RS resources.

8. The method according to claim 1, wherein identifying the difference between the first RLM parameters and the at least one second RLM parameter comprises:
   identifying that the first RLM parameters are a first group of RLM-RS resources; and
   identifying that the at least one second RLM parameter is a second group of RLM-RS resources which replace the first group of RLM-RS resources.

9. The method according to claim 8, further comprising adapting the second group of RLM-RS resources.

10. The method according to claim 1:
wherein the first group of RLM-RS resources is not the same type of RLM-RS resources as the second group of RLM-RS resources, and
wherein the UE does not reset any timers or counters.

11. The method according to claim 1:
wherein the first group of RLM-RS resources is the same type of RLM-RS resources as the second group of RLM-RS resources, and
wherein the UE resets at least one timer or counter.

12. A user equipment for performing radio link monitoring, comprising:
at least one processor; and
at least one storage that stores processor-executable instructions, when executed by the processor, causes a user equipment to:
perform a radio link monitoring (RLM) procedure with first RLM parameters;
receive, from a network node, a message including at least one second RLM parameter, wherein the first RLM parameters and the at least one second RLM parameter are RLM reference signal, RLM-RS, resources for in sync and out of sync indications;
identify a difference between the first RLM parameters and the at least one second RLM parameter, wherein the user equipment identifying the difference between the first RLM parameters and the at least one second RLM parameter comprises:
identifying that the first RLM parameters are a first group of RLM-RS resources; and
identifying that the at least one second RLM parameter is a second group of RLM-RS resources added to the first group of RLM-RS resources; and
reset at least one of the first RLM parameters in response to identifying the difference between the first RLM parameters and the at least one second RLM parameter; and
evaluate the first and second groups of RLM-RS resources by evaluating the second group of RLM-RS resourced before evaluating the first group of RLM-RS resources.

13. The user equipment according to claim 12, wherein the first RLM parameters and the at least one second RLM parameter are a combination of RLM-RS resources and BLER for in-sync and out-of-sync indications.

14. The user equipment according to claim 12, wherein the at least one storage stores processor-executable instructions that when executed by the processor further cause the user equipment to adapt the first group of the RLM-RS resources and the added second group of RLM-RS resources.

15. The user equipment according to claim 12, wherein the at least one storage stores processor-executable instructions that when executed by the processor to cause the user equipment to identify the difference between the first RLM parameters and the at least one second RLM parameter, further causes the user equipment to:
identify that the first RLM parameters are a first group of RLM-RS resources; and
identify that the at least one second RLM parameter is a second group of RLM-RS resources that replace a subset of the first group of RLM-RS resources.

16. The user equipment according to claim 15, wherein the at least one storage stores processor-executable instructions that when executed by the processor further cause the user equipment to adapt the partly-replaced first group of the RLM-RS resources and the replacing second group of RLM-RS resources.

17. The user equipment according to claim 12, wherein the at least one storage stores processor-executable instructions that when executed by the processor to cause the user equipment to identify the difference between the first RLM parameters and the at least one second RLM parameter further causes the user equipment to:
identify that the first RLM parameters are a first group of RLM-RS resources; and
identify that the at least one second RLM parameter is a second group of RLM-RS resources comprising the first group of RLM-RS resources without a subset of RLM-RS resources.

18. The use equipment according to claim 17, wherein the at least one storage stores processor-executable instructions that when executed by the processor further cause the user equipment to adapt the first group of RLM-RS resources without the subset of RLM-RS resources.

19. The user equipment according to claim 12, wherein the at least one storage stores processor-executable instructions that when executed by the processor to cause the user equipment to identify the difference between the first RLM parameters and the at least one second RLM parameter further causes the user equipment to:
identify that the first RLM parameters are a first group of RLM-RS resources; and
identify that the at least one second RLM parameter is a second group of RLM-RS resources which replace the first group of RLM-RS resources.

20. The user equipment according to claim 19, wherein the at least one storage stores processor-executable instructions that when executed by the processor further cause the user equipment adapt the second group of RLM-RS resources.

21. The user equipment according to claim 12:
wherein the first group of RLM-RS resources is not the same type of RLM-RS resources as the second group of RLM-RS resources, and
wherein the UE does not reset any timers or counters.

22. The user equipment according to claim 12:
wherein the first group of RLM-RS resources is the same type of RLM-RS resources as the second group of RLM-RS resources, and
wherein the UE resets at least one timer or counter.

23. A communication system for performing radio link monitoring comprising a user equipment and a network node:
a user equipment, UE, comprising at least one processor configured to:
perform a radio link monitoring (RLM) procedure with first RLM parameters;
receive, from a network node, a message including at least one second RLM parameter, wherein the first RLM parameters and the at least one second RLM parameter are RLM reference signal, RLM-RS, resources for in sync and out of sync indications;
identify a difference between the first RLM parameters and the at least one second RLM parameter, wherein the UE identifying the difference between the first RLM parameters and the at least one second RLM parameter comprises:
identifying that the first RLM parameters are a first group of RLM-RS resources; and identifying that the at least one second RLM parameter is a second group of RLM-RS resources added to the first group of RLM-RS resources;
reset at least one of the first RLM parameters in response to identifying the difference between the first RLM parameters and the at least one second RLM parameter; and
evaluate the first and second groups of RLM-RS resources by evaluating the second group of RLM-RS resourced before evaluating the first group of RLM-RS resources.

* * * * *

UNITED STATES PATENT AND TRADEMARK OFFICE
CERTIFICATE OF CORRECTION

| | |
|---|---|
| PATENT NO. | : 11,792,668 B2 |
| APPLICATION NO. | : 17/863144 |
| DATED | : October 17, 2023 |
| INVENTOR(S) | : Siomina et al. |

It is certified that error appears in the above-identified patent and that said Letters Patent is hereby corrected as shown below:

On the Title Page

Item (72), under "Inventors", in Column 1, Line 1, delete "Taby (SE);" and insert -- Täby (SE); --, therefor.

Item (56), under "OTHER PUBLICATIONS", in Column 2, Line 1, delete "Oualcomm" and insert -- Qualcomm --, therefor.

On Page 2, item (56), under "OTHER PUBLICATIONS", in Column 1, Line 2, delete "WG1 #90bis," and insert -- WG1 Meeting #90bis, --, therefor.

In the Specification

In Column 1, Line 6, delete "a 371" and insert -- a § 371 --, therefor.

In Column 1, Line 21, delete "referred as" and insert -- referred to as --, therefor.

In Column 1, Line 63, delete "example if" and insert -- example of --, therefor.

In Column 1, Line 66, delete "measurements on" and insert -- measurements of --, therefor.

In Column 2, Line 60, delete "$Q_{in}$," and insert -- $Q_{in}$. --, therefor.

In Column 2, Line 63, delete "(PCIFCH)" and insert -- (PCFICH) --, therefor.

In Columns 3-4, in Table 1, under "Stop", Line 11, delete "RAT." and insert -- RAT --, therefor.

In Columns 3-4, in Table 1, under "At expiry", Line 27, delete "5.6.13." and insert -- 5.6.13 --, therefor.

Signed and Sealed this
Sixteenth Day of April, 2024

Katherine Kelly Vidal
*Director of the United States Patent and Trademark Office*

CERTIFICATE OF CORRECTION (continued)
U.S. Pat. No. 11,792,668 B2

In Column 5, in Table, Line 13, delete "Dec" and insert -- Dec. --, therefor.

In Column 5, in Table, Line 40, delete "i/RRC" and insert -- i/ RRC --, therefor.

In Column 5, in Table, Line 42, delete "ii/RRC" and insert -- ii/ RRC --, therefor.

In Column 5, Line 57, delete "running" and insert -- running: --, therefor.

In Column 6, Line 42, delete "e.g" and insert -- e.g. --, therefor.

In Column 6, Line 48, delete "'other':" and insert -- 'other'; --, therefor.

In Columns 7-8, in Table 2, under "At expiry", Line 6, delete "5.6.4." and insert -- 5.6.4 --, therefor.

In Columns 7-8, in Table 2, under "Stop", Line 17, delete "RAT." and insert -- RAT --, therefor.

In Columns 7-8, in Table 2, under "At expiry", Line 24, delete "5.6.4." and insert -- 5.6.4 --, therefor.

In Column 8, Lines 53-54, delete "signal to noise and interference ratio (SINR)" and insert -- signal-to-interference-plus-noise ratio (SINR) --, therefor.

In Column 13, Line 13, delete "another yet" and insert -- yet another --, therefor.

In Column 14, Line 11, delete "Tablet," and insert -- tablet, --, therefor.

In Column 14, Line 12, delete "laptop embedded equipped (LEE)," and insert -- laptop embedded equipment (LEE), --, therefor.

In Column 16, Line 12, delete "RS s" and insert -- RSs --, therefor.

In Column 17, Line 32, delete "type of has" and insert -- type has --, therefor.

In Column 17, Line 39, delete "RLM-RSS." and insert -- RLM-RS5. --, therefor.

In Column 18, Line 40, delete "running" and insert -- running. --, therefor.

In Column 18, Line 63, delete "running" and insert -- running. --, therefor.

In Column 19, Line 15, delete "running" and insert -- running. --, therefor.

In Column 20, Line 5, delete "e.g," and insert -- e.g., --, therefor.

In Column 20, Line 14, delete "such configuring" and insert -- such as configuring --, therefor.

In Column 26, Lines 5-6, delete "auxiliary equipment 988," and insert -- auxiliary equipment 934, --, therefor.

CERTIFICATE OF CORRECTION (continued)
U.S. Pat. No. 11,792,668 B2

In Column 26, Line 32, delete "considered a" and insert -- considered as a --, therefor.

In Column 27, Line 5, delete "(SOC)." and insert -- (SoC). --, therefor.

In Column 27, Line 15, delete "units" and insert -- units. --, therefor.

In Column 27, Line 25, delete "manner" and insert -- manner. --, therefor.

In Column 28, Line 19, delete "considered a" and insert -- considered as a --, therefor.

In Column 28, Lines 27-28, delete "radio front end circuitry 990" and insert -- radio front end circuitry 992 --, therefor.

In Column 29, Line 45, delete "(CPE). a" and insert -- (CPE), a --, therefor.

In Column 29, Line 59, delete "narrow band" and insert -- narrowband --, therefor.

In Column 30, Line 28, delete "considered an" and insert -- considered as an --, therefor.

In Column 30, Lines 31-32, delete "Radio front end circuitry 914" and insert -- Radio front end circuitry 912 --, therefor.

In Column 30, Line 41, delete "considered a" and insert -- considered as a --, therefor.

In Column 31, Line 9, delete "SOC." and insert -- SoC. --, therefor.

In Column 31, Line 35, delete "manner" and insert -- manner. --, therefor.

In Column 33, Line 29, delete "power source 1033," and insert -- power source 1013, --, therefor.

In Column 34, Line 53, delete "data file 1027." and insert -- data 1027. --, therefor.

In Column 34, Line 60, delete "high-density digital versatile disc" and insert -- high-definition digital versatile disc --, therefor.

In Column 34, Line 67, delete "identity (SIM/RUIM) module," and insert -- identity module (SIM/RUIM), --, therefor.

In Column 36, Line 35, delete "memory 1190. Memory 1190" and insert -- memory 1190-1. Memory 1190-1 --, therefor.

In Column 37, Line 21, delete "onto" and insert -- into --, therefor.

In Column 40, Line 46, delete "in that" and insert -- such that --, therefor.

CERTIFICATE OF CORRECTION (continued)
U.S. Pat. No. 11,792,668 B2

In Column 41, Line 47, delete "in substep" and insert -- in step --, therefor.

In Column 42, Line 23, delete "according one" and insert -- according to one --, therefor.

In Column 44, Lines 11-12, delete "according one" and insert -- according to one --, therefor.

In the Claims

In Column 46, Line 17, in Claim 1, delete "resources, and" and insert -- resources; and --, therefor.

In Column 46, Line 24, in Claim 1, delete "parameter and" and insert -- parameter; and --, therefor.

In Column 46, Line 27, in Claim 1, delete "resourced" and insert -- resources --, therefor.

In Column 47, Line 42, in Claim 12, delete "resourced" and insert -- resources --, therefor.

In Column 47, Line 56, in Claim 15, delete "processor to" and insert -- processor --, therefor.

In Column 48, Line 6, in Claim 17, delete "processor to" and insert -- processor --, therefor.

In Column 48, Line 17, in Claim 18, delete "use" and insert -- user --, therefor.

In Column 48, Line 24, in Claim 19, delete "processor to" and insert -- processor --, therefor.

In Column 48, Line 37, in Claim 20, delete "equipment" and insert -- equipment to --, therefor.

In Column 49, Line 10, in Claim 23, delete "resourced" and insert -- resources --, therefor.